United States Patent
Fujiwara

(10) Patent No.: US 7,855,158 B2
(45) Date of Patent: Dec. 21, 2010

(54) OPTICAL GLASS, PREFORM FOR PRECISION PRESS-MOLDING, OPTICAL ELEMENT, AND METHODS FOR MANUFACTURING THE SAME

(75) Inventor: Yasuhiro Fujiwara, Tokyo (JP)

(73) Assignee: Hoya Corporation, Tokyo (JP)

( * ) Notice: Subject to any disclaimer, the term of this patent is extended or adjusted under 35 U.S.C. 154(b) by 372 days.

(21) Appl. No.: 12/019,113

(22) Filed: Jan. 24, 2008

(65) Prior Publication Data
US 2008/0293556 A1 Nov. 27, 2008

(30) Foreign Application Priority Data
Jan. 24, 2007 (JP) .............................. 2007-013395
Jul. 31, 2007 (JP) .............................. 2007-199238

(51) Int. Cl.
C03C 3/066 (2006.01)
C03C 3/068 (2006.01)
C03C 3/155 (2006.01)
C03B 23/00 (2006.01)
C03B 31/00 (2006.01)

(52) U.S. Cl. .......................... 501/79; 501/51; 501/78; 65/64

(58) Field of Classification Search .................. 501/41, 501/19, 50, 51, 73, 77, 78, 79; 65/63, 64, 65/66, 102, 127
See application file for complete search history.

(56) References Cited

U.S. PATENT DOCUMENTS
4,854,958 A * 8/1989 Marechal et al. ................ 65/64
(Continued)

FOREIGN PATENT DOCUMENTS
JP 2002-12443 A 1/2001

JP 2003201142 A 7/2003
JP 2005-263570 A 9/2005
JP 2006-16286 A 1/2006

(Continued)

*Primary Examiner*—Karl E Group
*Assistant Examiner*—Noah Wiess
(74) *Attorney, Agent, or Firm*—Sughrue Mion, PLLC

(57) ABSTRACT

Provided is an optical glass comprising, denoted as molar percentages:
10 to 20 percent $SiO_2$,
5 to 40 percent $B_2O_3$,
$SiO_2+B_2O_3$=15 to 50 percent,
0 to 10 percent $Li_2O$,
12 to 36 percent ZnO,
where $3 \times Li_2O + ZnO \geqq 18$ percent,
5 to 30 percent $La_2O_3$,
0 to 20 percent $Gd_2O_3$,
0 to 10 percent $Y_2O_3$,
$La_2O_3+Gd_2O_3$=10 to 30 percent,
$La_2O_3/SIGMA(\Sigma)RE_2O_3$=0.67 to 0.95
(where $SIGMA(\Sigma)RE_2O_3=La_2O_3+Gd_2O_3+Y_2O_3+Yb_2O_3+Sc_2O_3+Lu_2O_3$),
0.5 to 10 percent $ZrO_2$,
1 to 15 percent $Ta_2O_5$,
1 to 20 percent $WO_3$,
$Ta_2O_5/WO_3 \leqq 2.5$ (molar ratio),
0 to 8 percent $Nb_2O_5$,
0 to 8 percent $TiO_2$; and
having a refractive index nd of not less than 1.87 and an Abbé number nu(v)d of not less than 35 but less then 40.

A method for manufacturing a preform for precision press molding by separating a glass melt gob from a glass melt obtained by mixing, heating, and melting glass starting materials, and forming a preform in a glass melt gob cooling step, said mixing, heating, and melting of glass starting materials is conducted so as to obtain the above optical glass.

17 Claims, 1 Drawing Sheet

U.S. PATENT DOCUMENTS

| | | | |
|---|---|---|---|
| 6,413,894 B1 * | 7/2002 | Sato | 501/77 |
| 7,563,736 B2 * | 7/2009 | Kobayashi et al. | 501/50 |
| 2003/0211929 A1 * | 11/2003 | Hayashi et al. | 501/78 |
| 2005/0204776 A1 | 9/2005 | Hayashi | |
| 2006/0234850 A1 * | 10/2006 | Hayashi et al. | 501/78 |
| 2007/0049483 A1 * | 3/2007 | Hayashi | 501/78 |
| 2008/0207429 A1 * | 8/2008 | Izuki | 501/78 |

FOREIGN PATENT DOCUMENTS

| | | |
|---|---|---|
| JP | 2006-240889 A | 9/2006 |
| JP | 200763071 A | 3/2007 |
| JP | 200856554 A | 3/2008 |
| WO | WO 2005/042424 A1 * | 10/2004 |
| WO | WO 2006/093062 A1 | 9/2006 |
| WO | 2008016164 A1 | 2/2008 |

* cited by examiner

OPTICAL GLASS, PREFORM FOR PRECISION PRESS-MOLDING, OPTICAL ELEMENT, AND METHODS FOR MANUFACTURING THE SAME

CROSS-REFERENCE TO RELATED APPLICATIONS

This application claims benefit of priority under 35 USC 119 to Japanese Patent Application Nos. 2007-13395 and 2007-199238 respectively filed on Jan. 24, 2007 and Jul. 31, 2007, which are expressly incorporated herein by reference in its entirety.

BACKGROUND OF THE INVENTION

1. Field of the Invention

The present invention relates to an optical glass. The present invention further relates to a preform for precision press molding employing this optical glass, a method for manufacturing this preform, an optical element, and a method for manufacturing this optical element.

2. Discussion of the Background

Since the advent of digital cameras and telephones equipped with cameras, the integration and functional development of apparatuses employing optical systems have advanced rapidly. At the same time, requirements for high precision, lightweight, and compact optical systems have become ever more stringent.

To meet these requirements, optical designs employing aspherical lenses have increasingly entered the mainstream in recent years. Thus, precision press molding techniques (also known as mold pressing techniques) of directly molding optically functional surfaces by press molding without a grinding and/or polishing step have attracted attention in order to stably provide large quantities of inexpensive aspherical lenses employing high-functionality glass. The demand for optical glasses with low temperature softening properties that are suited to precision press molding is increasing each year. Such optical glasses include glasses of high refractive index and low dispersion. Patent Reference 1 describes an example of such a glass.

The glasses described in Patent Reference 1 are an optical glass characterized by comprising essential components in the form of $B_2O_3$, $La_2O_3$, $Gd_2O_3$, and ZnO; essentially comprising no lead and fluorine; and having a refractive index (nd) of 1.72 to 1.83, an Abbé number (nud) of 45 to 55, a glass transition temperature (Tg) of no higher than 630° C., and a viscosity at liquid phase temperature of not less than 0.6 Pa·s; and an optical glass characterized by comprising, denoted as molar percentages, 45 to 65 percent of $B_2O_3$, 5 to 22 percent of $La_2O_3$, 1 to 20 percent of $Gd_2O_3$ (where the combined content of $La_2O_3$ and $Gd_2O_3$ is 14 to 30 percent), 5 to 30 percent of ZnO, 0 to 10 percent of $SiO_2$, 0 to 6.5 percent of $ZrO_2$, and 0 to 1 percent of $Sb_2O_3$; essentially comprising no lead and fluorine; and having a refractive index (nd) of 1.72 to 1.83 and an Abbé number (nud) of 45 to 55.

Patent Reference 1: Japanese Unexamined Patent Publication (KOKAI) No. 2002-249337
Patent Reference 2: Japanese Unexamined Patent Publication (KOKAI) No. 2003-267748
Patent Reference 3: Japanese Unexamined Patent Publication (KOKAI) No. 2006-137662
Patent Reference 4: Japanese Unexamined Patent Publication (KOKAI) No. 2006-16286
Patent Reference 5: Japanese Unexamined Patent Publication (KOKAI) No. 2006-16293
Patent Reference 6: Japanese Unexamined Patent Publication (KOKAI) No. 2006-16295
Patent Reference 7: Japanese Unexamined Patent Publication (KOKAI) No. 2005-263570
Patent Reference 8: Japanese Unexamined Patent Publication (KOKAI) No. Showa 56-5345

All of the glasses described in above-cited Patent Reference 1 are so-called "high refractive index, low dispersion" optical glasses having refractive indexes (nd) of 1.72 to 1.83 and Abbé numbers (nud) of 45 to 55. However, there is a strong need to provide an optical glass having a "high refractive index and low dispersion" with a refractive index that is higher than the above-stated refractive index range and an Abbé number that is lower than the above-stated Abbé number range for the aspherical lenses employed in the digital cameras and camera-equipped telephones of recent years. Specifically, there is need for an optical glass having a refractive index nd of not less than 1.87 and an Abbé number nud of not less than 35 but less than 40.

Patent References 2 to 8 are examples of publications disclosing optical glasses having refractive indexes nd of not less than 1.87 and Abbé numbers nud of not less than 35 but less than 40 and optical glasses having physical properties (refractive indexes nd and Abbé numbers) that closely approximate these values.

To capitalize on the merits of the above-mentioned precision press molding techniques, it is desirable to directly produce from glass melt a glass material—known as a preform—for press molding. In this method, called preform hot forming, a glass melt is caused to flow out, glass melt gobs corresponding in weight to single preforms are successively separated, and the glass melt gobs obtained are formed into preforms having smooth outer surfaces in a cooling step. Accordingly, this method affords advantageous characteristics in that the glass use rate is higher than in methods in which relatively large glass blocks are formed from glass melt and then cut, ground, and polished; no glass scraps are produced during processing; and no processing time or cost is incurred.

However, in the hot forming method, a glass melt gob of weight corresponding to a single preform must be accurately separated and formed into a preform without defects such as devitrification and striae. Accordingly, glass having good stability over a high temperature range is required for hot forming.

When the refractive index nd is raised while maintaining an Abbé number nud of greater than a certain value, there is a strong tendency for the glass to crystallize, ultimately compromising vitrification. When even lower temperature softening properties are imparted to glasses employed in precision press molding, the stability of the glasses tends to decrease. Accordingly, it is difficult to realize glass stability at a level permitting preform hot forming while imparting low-temperature softening properties suited to precision press molding to glasses having a high refractive index and low dispersion.

Patent References 2 to 7 are examples of publications disclosing optical glasses having refractive indexes nd of not less than 1.87 and Abbé numbers nud of not less than 35 but less than 40, and optical glasses having physical properties (refractive indexes nd and Abbé numbers nud) approximating these values, as prerequisites for use as preforms in precision press molding. Patent Reference 8 is an example of a publication disclosing an optical glass that, although not anticipated for use as a preform in precision press molding, has a refractive index nd of not less than 1.87 and an Abbé number nud of not less than 35 but less than 40.

In terms of their refractive indexes nd and/or their Abbé numbers, the optical glasses of Patent References 3 to 7 fail to achieve the above-stated physical properties. The optical glass described in Patent Reference 2 has both a refractive index nd and an Abbé number nud that attain the above-stated physical properties. However, the optical glass described in Patent Reference 2, as will be set forth further below, has a low viscosity at liquid phase temperature; in methods of obtaining preforms by causing a glass melt to flow out and successively separating glass melts gobs of weight corresponding to single preforms, there is a problem in that it can be difficult to form a glass melt gob of weight corresponding to a single preform.

Patent Reference 8 is a publication predating the practice of precision press molding techniques. The optical glass described therein is not anticipated for use as a preform in precision press molding. Thus, Patent Reference 8 does not give the glass transition temperature or liquid phase temperature of the optical glass. Thus, a determination of whether or not use as a preform in precision press molding is possible cannot be made based on the description given in the publication alone. As an example, the present inventors produced the glass described in Embodiment 5 of Patent Reference 8, but glass stability was poor and the glass melt devitrified during stirring, precluding vitrification.

Accordingly, the present invention, devised to solve the above-stated problems, has for its object to provide an optical glass having a refractive index nd of not less than 1.87 and an Abbé number nud of not less than 35 but less than 40; possessing a viscosity temperature dependency permitting the ready forming of preforms for precision press molding; affording good glass stability; and having low temperature melting properties permitting precision press molding with good productivity. Further objects of the present invention are to provide a method for manufacturing preforms for precision press molding from this glass and a method for manufacturing an optical element comprised of this glass.

SUMMARY OF THE INVENTION

The present invention, devised to solve the above-stated problems, is an optical glass comprising, denoted as molar percentages:

0 to 20 percent $SiO_2$,
5 to 40 percent $B_2O_3$,
$SiO_2+B_2O_3$=15 to 50 percent,
0 to 10 percent $Li_2O$,
12 to 36 percent ZnO,
where $3\times Li_2O+ZnO \geq 18$ percent,
5 to 30 percent $La_2O_3$,
0 to 20 percent $Gd_2O_3$,
0 to 10 percent $Y_2O_3$,
$La_2O_3+Gd_2O_3$=10 to 30 percent,
$La_2O_3$/SIGMA($\Sigma$)$RE_2O_3$=0.67 to 0.95
(where SIGMA($\Sigma$)$RE_2O_3$=$La_2O_3+Gd_2O_3+Y_2O_3+Yb_2O_3+Sc_2O_3+Lu_2O_3$),
0.5 to 10 percent $ZrO_2$,
1 to 15 percent $Ta_2O_5$,
1 to 20 percent $WO_3$,
$Ta_2O_5/WO_3 \leq 2.5$ (molar ratio),
0 to 8 percent $Nb_2O_5$,
0 to 8 percent $TiO_2$; and
having a refractive index nd of not less than 1.87 and an Abbé number nu(v)d of not less than 35 but less then 40.

In the optical glass of the present invention, the $Gd_2O_3$ content preferably exceeds 0.4 percent and the glass transition temperature Tg is preferably not greater than 650° C. and the liquid phase temperature LT preferably does not exceed 1100° C.

The present invention further relates to a preform for precision press molding comprised of the optical glass of the present invention, and an optical element comprised of the optical glass of the present invention.

The present invention still further relates to a method for manufacturing a preform of precision press molding by separating a glass melt gob from a glass melt obtained by mixing, heating, and melting glass starting materials, and forming a preform in a glass melt gob cooling step, wherein said mixing, heating, and melting of glass starting materials is conducted so as to obtain an optical glass of the present invention.

The present invention still further relates to a method for manufacturing an optical element comprising: heating a preform of the present invention or a preform manufactured by a method of manufacturing a preform for precision press molding of the present invention, and conducting precision press molding with a pressing mold.

In the method for manufacturing an optical element of the present invention, it is preferred that the method further comprising introducing a preform into said pressing mold and heating both said pressing mold and said preform; or that the method further comprising introducing a preheated preform into a preheated pressing mold and conducting precision press molding.

DESCRIPTIONS OF THE EMBODIMENTS

Figure 1:
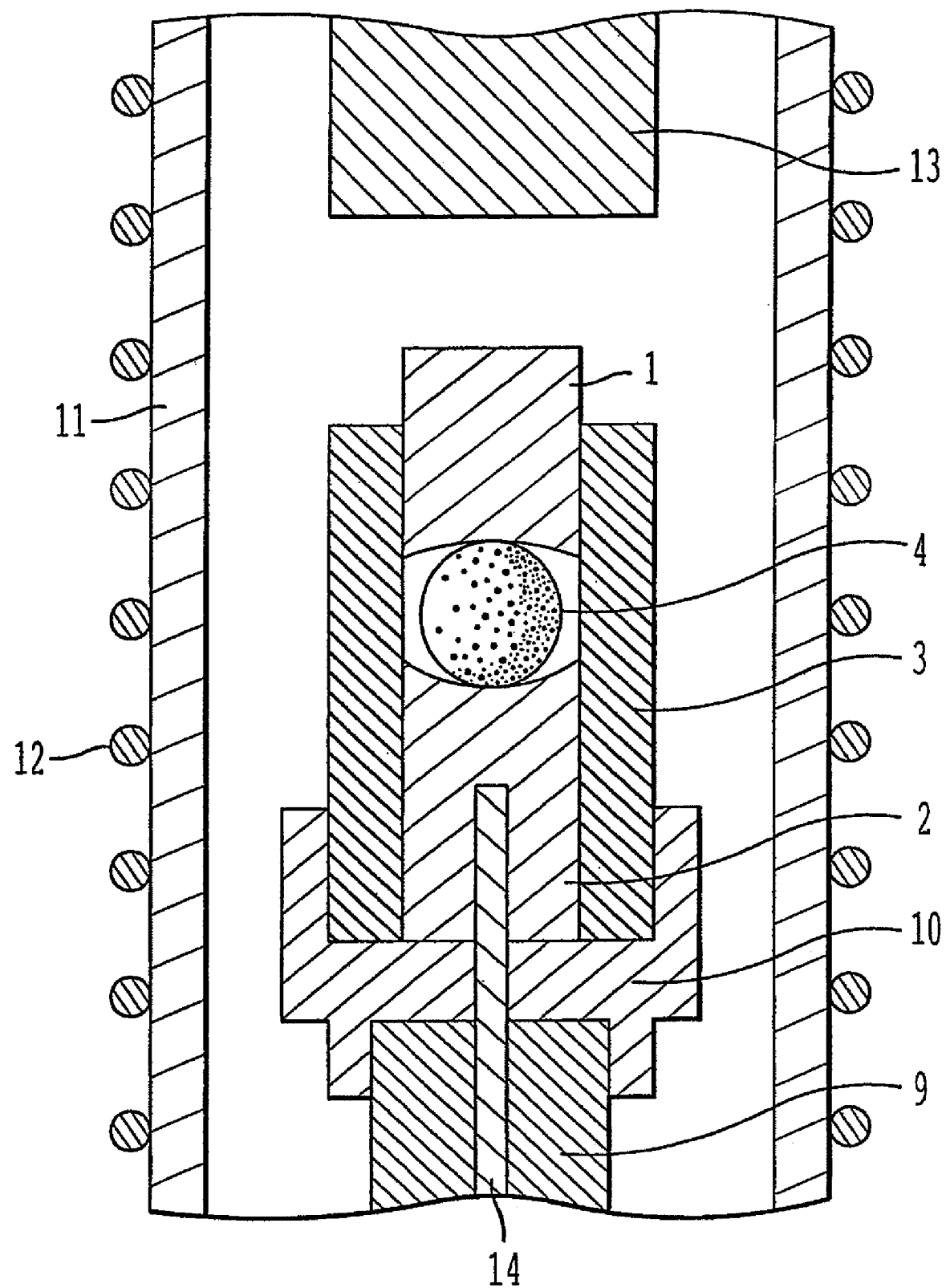
FIG. 1 is a sectional view descriptive of a precision press molding device. The numbers in the FIG. 1 are as follows:
1: Upper mold
2: Lower mold
3: Sleeve
4: Preform for precision press molding
9: Support rod
10: Holding member
11: Quartz tube
12: Heating coil
13: Pressing rod
14: Thermocouple

Below, unless specifically indicated otherwise, the various contents and combined contents are given as molar percentages, the ratios between content quantities, the ratios between combined quantities, and the ratios between content quantities and combined quantities are stated as molar ratios. In the present specification, the combined content of $SiO_2$ and $B_2O_3$ is denoted as $SiO2+B_2O_3$; three times the $Li_2O$ content added to the ZnO content is denoted as $3\times Li_2O+ZnO$; the combined content of $La_2O_3$ and $Gd_2O_3$ is denoted as $La_2O_3+Gd_2O_3$; the combined content of $La_2O_3+Gd_2O_3+Y_2O_3+Yb_2O_3+Sc_2O_3+Lu_2O_3$ is denoted as SIGMA($\Sigma$)$RE_2O_3$, the ratio of the content of $La_2O_3$ to SIGMA($\Sigma$)$RE_2O_3$ is denoted as $La_2O_3$/SIGMA($\Sigma$)$RE_2O_3$, and the ratio of $Ta_2O_5$ to $WO_3$ is denoted as $Ta_2O_5/WO_3$.

$SiO_2$ is an optional component that enhances the stability of the glass when introduced in suitable quantity and functions to impart a suitable viscosity when forming preforms from glass melt. However, the introduction of an excessive quantity lowers the refractive index and compromises the melting properties of the glass. Thus, the quantity is 0 to 20 percent, desirably 0 to 16 percent, preferably 2 to 14 percent, and still more preferably, 5 to 12 percent.

$B_2O_3$, a glass network forming component, imparts a low dispersion property and functions to lower the glass transition temperature. When the content is less than 5 percent, the stability of the glass decreases, the liquid phase temperature rises, and it becomes difficult to mold preforms. However, the introduction of an excessive quantity lowers the refractive index. Accordingly, the $B_2O_3$ content in the optical glass of the present invention is 5 to 40 percent, desirably falling within a range of 6 to 37 percent, preferably falling within a range of 12 to 35 percent, more preferably falling within a range of 20 to 33 percent, and still more preferably, falling within a range of 25 to 33 percent.

However, to impart stability to the glass and suppress a rise in the liquid phase temperature so as to permit hot forming of preforms, the combined quantity of $B_2O_3$ and $SiO_2$ is set to not less than 15 percent. However, the refractive index drops when the combined quantity of $B_2O_3$ and $SiO_2$ exceeds 50 percent, so the combined quantity is set to 15 to 50 percent, desirably falling within a range of 20 to 47 percent, preferably a range of 25 to 44 percent, more preferably falling within a range of 30 to 42 percent, and still more preferably, falling within a range of 33 to 40 percent.

$Li_2O$ is an essential component that raises the refractive index more than other alkali metal oxide components and greatly lowers the glass transition temperature. It also functions to enhance glass melting properties. However, the incorporation of an excessive quantity lowers the resistance to devitrification of the glass, compromises the direct forming of high-quality preforms from outflowing glass melt, and lowers weatherability. Accordingly, the content thereof is set to 0 to 10 percent. When priority is given to further lowering the glass transition temperature, further reducing the glass temperature and the temperature of the pressing mold during precision press molding, the $Li_2O$ content is desirably 0.5 to 10 percent, preferably 0.5 to 7 percent, more preferably 0.5 to 5 percent, and still more preferably, 0.5 to 3 percent.

When forming a preform comprised of glass melt or a molded glass member serving as a preform material, $Li_2O$ volatizes from the surface of hot glass, producing striae. Accordingly, when priority is placed on suppressing striae, the $Li_2O$ content is desirably set to from 0 to 0.5 percent (0.5 percent excluded).

The above-described glass in which priority is placed on reducing the glass transition temperature will be referred to as Glass 1, and the glass in which priority is placed on reducing striae in the forming of a molded glass produced from glass melt will be referred to as Glass 2. Glass 1 is an optical glass comprising, denoted as molar percentages:

0 to 20 percent $SiO_2$,
5 to 40 percent $B_2O_3$,
$SiO_2+B_2O_3=15$ to 50 percent,
0.5 to 10 percent $Li_2O$,
12 to 36 percent ZnO,
where $3 \times Li_2O + ZnO \geqq 18$ percent,
5 to 30 percent $La_2O_3$,
0 to 20 percent $Gd_2O_3$,
0 to 10 percent $Y_2O_3$,
$La_2O_3+Gd_2O_3=10$ to 30 percent,
$La_2O_3/SIGMA(\Sigma)RE_2O_3=0.67$ to 0.95
(where $SIGMA(\Sigma)RE_2O_3=La_2O_3+Gd_2O_3+Y_2O_3+Yb_2O_3+Sc_2O_3+Lu_2O_3$),
0.5 to 10 percent $ZrO_2$,
1 to 15 percent $Ta_2O_5$,
1 to 20 percent $WO_3$,
$Ta_2O_5/WO_3 \leqq 2.5$ (molar ratio),
0 to 8 percent $Nb_2O_5$,
0 to 8 percent $TiO2$; and
having a refractive index nd of not less than 1.87 and an Abbé number nu(v)d of not less than 35 but less then 40.

Glass 2 is an optical glass comprising, denoted as molar percentages:

0 to 20 percent $SiO_2$,
5 to 40 percent $B_2O_3$,
$SiO_2+B_2O_3=15$ to 50 percent,
0 to 0.5 percent $Li_2O$ (0.5 percent excluded),
12 to 36 percent ZnO,
where $3 \times Li_2O + ZnO \geqq 18$ percent,
5 to 30 percent $La_2O_3$,
0 to 20 percent $Gd_2O_3$,
0 to 10 percent $Y_2O_3$,
$La_2O_3+Gd_2O_3=10$ to 30 percent,
$La_2O_3/SIGMA(\Sigma)RE_2O_3=0.67$ to 0.95
(where $SIGMA(\Sigma)RE_2O_3=La_2O_3+Gd_2O_3+Y_2O_3+Yb_2O_3+Sc_2O_3+Lu_2O_3$),
0.5 to 10 percent $ZrO_2$,
1 to 15 percent $Ta_2O_5$,
1 to 20 percent $WO_3$,
$Ta_2O_5/WO_3 \leqq 2.5$ (molar ratio),
0 to 8 percent $Nb_2O_5$,
0 to 8 percent $TiO_2$; and
having a refractive index nd of not less than 1.87 and an Abbé number nu(v)d of not less than 35 but less then 40.

In both Glasses 1 and 2, it is undesirable to introduce alkali metal oxide components other than $Li_2O$. With the exception of $Li_2O$ content, Glasses 1 and 2 share important requirements and preferred ranges.

ZnO is an essential component that functions to lower the melting temperature, liquid phase temperature, and glass transition temperature; increase the chemical durability and weatherability of the glass; and raise the refractive index. However, it becomes difficult to maintain an Abbé number nu(v)d of greater than or equal to 35 when an excessive quantity of ZnO is incorporated. Thus, the content thereof is set to 12 to 36 percent, desirably 18 to 34 percent, preferably 21 to 32 percent, and still more preferably, 23 to 30 percent.

ZnO and $Li_2O$ are important components that reduce the refractive index more than other refractive index components, such as rare earth components, as well as reducing the glass transition temperature. In high-refractive index, high-dispersion, rare earth borate glasses of low ZnO and $Li_2O$ content, the glass transition temperature Tg sometimes exceeds 650° C., greatly compromising precision press formability. Accordingly, to obtain a glass of high refractive index and high dispersion, it is desirable to keep the contents of the elements as low as possible. However, in the present invention, to reduce the glass transition temperature and permit high productivity in precision press molding, it is necessary to increase the content of ZnO and $Li_2O$.

In the optical glass of the present invention, a comparison of the effects per unit content (molar percentage) of ZnO and $Li_2O$ on reducing the glass transition temperature revealed that while rare earth components; Zr, Ta, and other high-refractive index components; and $B_2O_3$ and $SiO_2$ had almost no (zero) effect in reducing the glass transition temperature, when the effect on reducing the glass transition temperature of ZnO was denoted as 1, the effect on reducing the glass transition temperature of $Li_2O$ was about 3. Accordingly, an index in which $Li_2O$ and ZnO are imparted with different contribution rates, in the form of $3 \times Li_2O + ZnO$ (molar percentage), was introduced as an index of the amount of reduction in glass transition temperature. It was discovered that obtaining a high refractive index, high dispersion glass suited to precision press molding required a value of $3 \times Li_2O+ZnO$ (molar percentage) of 18 percent or greater. The value of $3 \times Li_2O+ZnO$ (molar percentage) is desirably 20 percent or greater, preferably 22 percent or greater, and more preferably, 25 percent or greater.

Since rare earth components increase the refractive index while maintaining low dispersion, they are necessary components for achieving the high refractive index, low dispersion optical glass that is the object of the present invention.

$La_2O_3$, a rare earth component, is an essential component that raises the refractive index while maintaining low dispersion, and functions to increase chemical durability and weatherability. However, incorporation in excessive quantity diminishes the stability of the glass and raises the glass transition temperature. Thus, the content is set to 5 to 30 percent, desirably 8 to 25 percent, preferably 10 to 20 percent, and more preferably, 12 to 18 percent.

$Gd_2O_3$, a rare earth component, is an optional component functioning in a manner similar to $La_2O_3$. However, incorporation in excessive quantity diminishes the stability of the glass and raises the glass transition temperature. Thus, the content is set to 0 to 20 percent, desirably 0.4 to 20 percent, preferably 0.4 to 15 percent, more preferably 0.8 to 8 percent, still more preferably 0.8 to 6 percent, and yet still more preferably, 1.0 to 4.8 percent.

$Y_2O_3$, a rare earth component, is an optional component that functions similar to $La_2O_3$ and $Gd_2O_3$. However, incorporation in excessive quantity diminishes the stability of the glass and raises the glass transition temperature. Thus, the content is set to 0 to 10 percent, desirably 0 to 4 percent, preferably 0 to 1 percent (excluding 1 percent), and preferably, no incorporation at all.

Additionally, the rare earth components $Yb_2O_3$, $Sc_2O_3$, and $Lu_2O_3$ are optional components that function similarly to $La_2O_3$ and $Gd_2O_3$. However, incorporation in excessive quantity diminishes the stability of the glass and raises the glass transition temperature, and in particular, affords the drawback of raising the liquid phase temperature. Thus, the content is set to 0 to 5 percent, desirably 0 to 2 percent, and preferably, no incorporation at all.

The presence of multiple rare earth components ($La_2O_3$, $Gd_2O_3$, $Y_2O_3$, and the like) rather than a single rare earth element in the glass permits an increase in the combined content of rare earth components while maintaining glass stability. In particular, in the glass of the present invention, the joint presence of $La_2O_3$ and $Gd_2O_3$, which afford a high increase in the refractive index per unit incorporated, is an effective way to raise the refractive index. Thus, $La_2O_3+Gd_2O_3$ is set to 10 to 30 percent, desirably 13 to 27 percent, and preferably, 16 to 25 percent.

The ratio of the multiple rare earth components relates closely to the liquid phase temperature and stability of the glass of the present invention. For example, as related in Patent Reference 2 (Japanese Unexamined Patent Publication (KOKAI) No. 2003-267748), in a high refractive index, low dispersion, rare earth borate glass, the molar ratio of $La_2O_3$ to rare earth components of the glass is set to 0.35 to 0.66 to obtain a stable glass while increasing the quantity of rare earth components imparting a high refractive index and low dispersion to the glass, as well as permitting a reduction in the liquid phase temperature and an increase in high temperature viscosity.

Such a composition design technique is effective for manufacturing glass having a refractive index of about nd=1.8 to 1.86. However, when attempting to obtain a glass having a high refractive index of 1.87 or more, the further addition of high refractive index components diminishes the stability of the glass, raises the liquid phase temperature, and produces a marked increase in the glass transition temperature. Thus, such a technique alone does not readily permit the manufacturing of glass of adequate stability having a high liquid phase temperature with high productivity.

In the glasses of Embodiments 21 and 24 described in Patent Reference 2 (Japanese Unexamined Patent Publication (KOKAI) No. 2003-267748), $La_2O_3/SIGMA(\Sigma)RE_2O_3=0.5$. The refractive indexes nd, at 1.87132 and 1.88085, are high. The glass transition temperature, at 617° C., is relatively low relative to the glass transition temperature of conventional optical glasses. However, the liquid phase temperature of these glasses is a high 1,250° C., resulting in a low viscosity at liquid phase temperature of 1 to 1.5 dPa·s.

In Embodiments 43 and 44 described in Patent Reference 3 (Japanese Unexamined Patent Publication (KOKAI) No. 2006-137662), $La_2O_3/SIGMA(\Sigma)RE_2O_3=0.5$. The refractive indexes nd, at 1.8631 and 1.8638, are high. The glass transition temperatures, at 625 and 622° C., are relatively low relative to the glass transition temperatures of conventional optical glasses. However, the liquid phase temperatures of these glasses, at about 1,210° C. and 1170° C., are high, resulting in a low viscosity at liquid phase temperature of 1 to 1.5 dPa·s.

In Embodiment A-6 described in Patent Reference 3 (Japanese Unexamined Patent Publication (KOKAI) No. 2006-137662), $La_2O_3/SIGMA(\Sigma)RE_2O_3=0.5$. The refractive index nd, at 1.86865, is high. With a glass transition temperature Tg of 604° C., the glass transition temperature is relatively low relative to conventional optical glasses. However, the liquid phase temperature of this glass is a high 1,250° C., so the viscosity at liquid phase temperature is about 1 dPa·s.

In the glass with an $nd \geq 1.87$ of the present invention, changes in glass stability caused by combinations of high refractive index components other than rare earth components, such as Zr, Ta, W, Nb, and Ti, and individual rare earth components cannot be overlooked. It was discovered that increases in the quantity of Zr, Ta, W, Nb, Ti and the like resulted in changes in the optimal values of the molar ratio of $La_2O_3$ in rare earth components. That is, it was discovered that with an increase in the contents of Zr, Ta, W, Nb, and Ti, the effect on glass stability reduction per unit of increase in refractive index due to the joint presence of high refractive index components other than rare earth components was least for $La_2O_3$, and the glass stability reduction effects of other rare earth components, such as $Gd_2O_3$, increased. Accordingly, to manufacture a high refractive index, low dispersion glass with high stability, low liquid phase temperature, and high viscosity at liquid phase temperature from 2 to 10 dPa·s, thus suited for high productivity precision press molding, it is necessary to employ other rare earth components such as $Gd_2O_3$ in combination with $La_2O_3$ while keeping their content ratio to no greater than 0.33. Specifically, the ratio of rare earth components, with $La_2O_3$ as the primary component, is set to $La_2O_3/SIGMA(\Sigma)RE_2O_3=0.67$ to 0.95. From the above perspectives, the lower limit of $La_2O_3/SIGMA(\Sigma)RE_2O_3$ is desirably 0.68, preferably 0.69, more preferably 0.70, still more preferably 0.73, and yet still more preferably, 0.76. The upper limit of $La_2O_3/SIGMA(\Sigma)RE_2O_3$ is desirably 0.94, preferably 0.93, more preferably 0.90, and still more preferably, 0.88.

Based on this composition, the present invention achieves formability that is markedly better than that of conventional glass while affording a high refractive index, low dispersion, and a low temperature softening property. That is, the forming of glass melt into desired shapes and the direct manufacturing of preforms for precision press molding from glass melt is facilitated, permitting enhanced productivity of optically uniform, stria-free molded glass members, such as preforms.

$ZrO_2$ is an essential component that is incorporated to enhance glass stability and weatherability and adjust optical constants. The incorporation of a small quantity serves to increase the stability of the glass, but excessive incorporation diminishes glass stability and increases dispersion. Thus, the content is set to 0.5 to 10 percent, desirably 0.5 to 7 percent, preferably 1 to 6 percent, and more preferably, 3 to 5 percent.

$Ta_2O_5$ is an essential component that is incorporated to greatly increase glass stability, enhance weatherability, and adjust optical constants. However, excessive incorporation raises the glass transition temperature, diminishes the stability of the glass, and increases dispersion. Thus, the content is set to 1 to 15 percent, desirably 1 to 10 percent, preferably 1 to 8 percent, and still more preferably, 1 to 6 percent.

$WO_3$ is an essential component that is incorporated to increase glass stability with relatively little increase in the glass transition temperature, enhance glass weatherability, and adjust optical constants. However, excessive incorporation greatly compromises the dispersion of the glass. Thus, the content is set to 1 to 20 percent, desirably 1 to 17 percent, preferably 2 to 13 percent, more preferably 3 to 10 percent, and still more preferably, 5 to 9 percent. $WO_3$ has the same properties as $TiO_2$ with regard to its effect on the refractive index of the glass. Thus, the desirable range varies somewhat depending on whether or not $TiO_2$ is incorporated into the glass. However, the degree of change in the desirable range also differs based on the quantity of $TiO_2$. From that perspective, the above range is often applicable when $TiO_2$ is incorporated. When $TiO_2$ is not incorporated, the $WO_3$ content is set to 1 to 20 percent, desirably 1 to 17 percent, preferably 3 to 15 percent, more preferably 4 to 14 percent, and still more preferably, 5 to 13 percent.

In the glass of the present invention, to achieve a low temperature softening property and thermal stability suited to precision press molding, greater emphasis is placed on the stability of the glass and its liquid phase temperature than on low dispersion than is the case in conventional high refractive index, high dispersion optical glasses. Thus, it is desirable to increase the content ratio of $Ta_2O_5$ and $WO_3$ to increase the stability of the glass, lower the liquid phase temperature, and lower the glass transition temperature. Thus, the combined quantity of $Ta_2O_5$ and $WO_3$ is desirably 6 to 25 percent, desirably 8 to 24 percent, preferably 10 to 23 percent, and still more preferably, 11 to 21 percent.

To increase the refractive index, the glass of the present invention comprises high refractive index components the atomic numbers of which are high even among high refractive index, low dispersion components. The increase in the specific gravity of the glass that accompanies the increase in atomic number of the components incorporated risks lowering the formability of the glass melt due to the reduced kinematic viscosity of the glass, limiting applications due to the increased weight of the lens element obtained, and the like. The use of expensive starting materials in the form of rare metals such as $Ta_2O_5$ is desirably avoided to the extent possible. Based on these considerations, high specific gravity components such as $WO_3$, $Ta_2O_5$, and $Gd_2O_3$ are desirably employed as follows.

When the molar ratio of $Ta_2O_5/Gd_2O_3$ is large, the dispersion of the glass increases, the liquid phase temperature of the glass rises, and stability decreases, thereby increasing the specific gravity and manufacturing costs. Thus, the molar ratio of $Ta_2O_5/Gd_2O_3$ is desirably not greater than 1.5, preferably not greater than 1.4, more preferably not greater than 1.3, still more preferably not greater than 1.2, and yet still more preferably, not greater than 1.1.

Additionally, when $Ta_2O_5/WO_3$ is large, although there is an advantage in that dispersion decreases, there are drawbacks in that the glass transition temperature rises, the liquid phase temperatures rises, stability decreases, and manufacturing costs increase. Thus, the molar ratio of $Ta_2O_5/WO_3$ in the present invention is set to not greater than 2.5, desirably not greater than 1.5, preferably not greater than 1.0, more preferably not greater than 0.8, and still more preferably, not greater than 0.6.

$Nb_2O_5$ is a component that is incorporated in small quantities to raise the refractive index of the glass, enhance the weatherability of the glass, and adjust optical constants. However, excessive incorporation greatly compromises glass dispersion and diminishes the stability of the glass. Thus, the content is set to 0 to 8 percent, desirably 0 to 5 percent, preferably 0 to 3 percent, and more preferably, none is incorporated at all.

$TiO_2$ is a component that when incorporated in small quantity, raises the refractive index of the glass and increases the stability of the glass. However, excessive incorporation greatly compromises glass dispersion as well as the thermal stability, liquid phase temperature, and degree of coloration of the glass. Thus the content is set to 0 to 8 percent, desirably 0 to 6 percent, preferably 0 to 4 percent, and more preferably, 0 to 2 percent. However, when $TiO_2$ is incorporated, the lower limit of the $TiO_2$ content is desirably 0.5 percent and preferably 1 percent. When placing priority on reducing coloration of the glass, it is desirable not to incorporate $TiO_2$. Ti tends to cause changes in valence at elevated temperatures, reacting with the molding surface of the pressing mold during precision press molding and potentially causing failure. To avoid such problems, it is possible not to incorporate $TiO_2$ into the glass.

MgO, CaO, SrO, and BaO can be employed to enhance the low dispersion of the glass and adjust the glass transition temperature and refractive index. However, excessive incorporation diminishes glass stability and increases the liquid phase temperature. Thus, the combined content of MgO, CaO, SrO, and BaO is desirably 0 to 8 percent, preferably 0 to 6 percent, and more preferably, 0 to 4 percent.

$Sb_2O_3$ is an optional additive used as a clarifying agent. Its addition in small quantity reduces absorption due to reduction of impurities such as iron and inhibits coloration of the glass. However, excessive incorporation results in the loss of these effects and change in the molding surface of the pressing mold during precision press molding that adversely affects the service lifetime of the pressing mold, and is thus undesirable from the perspective of precision press molding. Accordingly, the quantity added is desirably 0 to 2 percent, preferably 0 to 1 percent, more preferably 0 to 0.8 percent, and still more preferably, 0 to 0.5 percent.

When a component other than $SiO_2$, $B_2O_3$, $Li_2O$, ZnO, $La_2O_3$, $Gd_2O_3$, $Y_2O_3$, $Yb_2O_3$, $Sc_2O_3$, $Lu_2O_3$, $ZrO_2$, $Ta_2O_5$, $WO_3$, $Nb_2O_5$, and $TiO_2$ or a clarifying agent in the form of $Sb_2O_3$ is added in large quantity to the optical glass of the present invention, there is a risk of causing problems such as reduced high refractive index characteristics and low dispersion properties, diminished thermal stability of the glass, an increased liquid phase temperature, diminished visible light transmittance, pressing mold deterioration due to increased reactivity between the glass and the pressing mold during precision press molding, and poor productivity due to increased reactivity between the glass melt and platinum constituting the melt container and outflow pipe. Thus, the combined quantity of $SiO_2$, $B_2O_3$, $Li_2O$, ZnO, $La_2O_3$, $Gd_2O_3$, $Y_2O_3$, $Yb_2O_3$, $Sc_2O_3$, $Lu_2O_3$, $ZrO_2$, $Ta_2O_5$, $WO_3$, $Nb_2O_5$, and $TiO_2$ is desirably greater than or equal to 97 percent, preferably greater than or equal to 98 percent, more preferably greater than or equal to 99 percent, and still more preferably, 100 percent.

In a $B_2O_3$-$La_2O_3$ composition, F serves to increase the possible range of vitrification in terms of optical characteristics and lowers the glass transition temperature. However, when present together with $B_2O_3$, markedly high volatility is exhibited at elevated temperature, with volatization during glass melting and molding. This makes it difficult to produce large quantities of glass of constant refractive index. Further, volatile matter escaping from the glass during precision press molding adheres to the pressing mold; when such a mold is repeatedly employed, there is a problem in that lens surface precision deteriorates. Accordingly, the F content is desirably kept to 8 percent or less, preferably 4 percent or less, more preferably 2 percent or less, and still more preferably, none is incorporated at all.

$GeO_2$ can also be incorporated in a range of from 0 to 10 percent, for example. However, it is an expensive component that promotes reduction. Thus, the quantity introduced is desirably kept to 4 percent or less, it being preferable to incorporate none at all.

$Bi_2O_3$ can be introduced in a range of 0 to 4 percent for example. However, it reduces the thermal stability of the glass, compromises the low dispersion of the glass, and greatly reduces the partial dispersion ratio PgF. Thus, the quantity incorporated is desirably kept to 2 percent or less, it being preferable to incorporate none at all.

Due to negative effects on the environment, the incorporation of Pb, Cr, Cd, As, Th, Te, and U is to be avoided. Conventionally, Pb has been employed as a principal component of optical glass due to its high refractive index. However, in addition to environmental issues, it is readily reduced by precision press molding in a nonoxidizing gas environment. The metal lead that precipitates out adheres to the molding surface of the pressing mold, creating a problem by reducing the surface precision of press-molded products. Conventionally, $As_2O_3$ has also been added as a clarifying agent, but in addition to environmental issues, it oxidizes the molding surface of the pressing mold, creating a problem by shortening the service lifetime of the mold, and must thus not be incorporated.

Substances that color the glass, such as Fe, Cu, and Co, are desirably not incorporated other than to impart desired spectral properties to the glass.

The optical glass of the present invention has a refractive index nd of not less than 1.87 and an Abbé number nu(v)d of not less than 35 but less than 40. Glasses having optical constants falling within these ranges can be expected to afford a relatively high refractive index and relatively low dispersion (a relatively high Abbé number) when employed as materials for optical elements. Additionally, the lower the glass transition temperature is made, the higher the refractive index, the lower the dispersion, and the greater the decrease in the stability of the glass. Taking this into account, the nd desirably falls within a range of 2.0 or lower, preferably 1.97 or lower, more preferably 1.94 or lower, and still more preferably, 1.90 or lower. The nu(v)d desirably falls within a range of 35.5 or greater, desirably 35.5 or greater and 39.5 or lower, and preferably, 36.0 or greater and 39.0 or lower.

According to the optical glass of the present invention, it is possible to achieve a low glass transition temperature suited to precision press molding. One object of the present invention is to provide an optical glass affording a low temperature softening property permitting precision press molding with good productivity. One index of a low temperature softening property is the glass transition temperature (Tg). The optical glass of the present invention achieves a low glass transition temperature. As a result, it exhibits a low temperature softening property that permits precision press molding with good productivity.

The optical glass of the present invention exhibits a low temperature softening property in the form of a glass transition temperature of 650° C. or less. A more desirable range for the glass transition temperature of the optical glass of the present invention is 640° C. or less, preferably 630° C. or less, more preferably 620° C. or less, and still more preferably, 610° C. or less. However, when the glass transition temperature is rendered excessively low, it becomes difficult to achieve an even higher refractive index and lower dispersion, and/or glass stability and chemical durability tend to decrease. Thus, the glass transition temperature is desirably not less than 510° C., preferably not less than 540° C., more preferably not less than 560° C., and still more preferably, not less than 580° C.

Another index of the low temperature softening property is the yield point (Ts) of the glass. The yield point (Ts) of the optical glass of the present invention desirably falls within a range of 700° C. or less, preferably 690° C. or less, more preferably 680° C. or less, still more preferably 670° C. or less, and yet still more preferably, 660° C. or less. When the yield point (Ts) is rendered excessively low, it becomes difficult to achieve an even higher refractive index and lower dispersion, and/or glass stability and chemical durability tend to decrease. Accordingly, a yield point (Ts) of 550° C. or greater is desirable, 580° C. or greater is preferred, 600° C. or greater is of still greater preference, and 620° C. or greater is of yet still greater preference.

The optical glass of the present invention has good glass stability. For example, adopting stability in the high temperature range required when molding glass from a glass melt as the standard, it is possible to achieve glass with a liquid phase temperature of 1,100° C. or lower. Since the optical glass of the present invention can maintain a liquid phase temperature at or below a prescribed temperature while remaining a high refractive index, low dispersion glass in this manner, it is possible to mold preforms for precision press molding directly from glass melt. The liquid phase temperature range is desirable 1,080° C. or lower, preferably 1,070° C. or lower, and more preferably, 1,060° C. or lower. There is no specific lower limit to the liquid phase temperature, but when the liquid phase temperature is rendered lower than is required, the refractive index nd decreases, the Abbé number nu(v)d drops, and the glass transition temperature Tg rises. Thus, within the above-stated range, a liquid phase temperature of 980° C. or greater is desirable, 1,010° C. or greater is preferred, 1,030° C. or greater is of greater preference, and 1,050° C. or greater is of still greater preference.

In the optical glass of the present invention, the viscosity at liquid phase temperature falls within a range suited to a forming method for obtaining preforms by causing glass melt to flow out and successively separating glass melt gobs of weight corresponding to individual preforms. The desirable range of the viscosity at liquid phase temperature of the optical glass of the present invention is 2 to 10 dPa·s, 2 to 8 dPa·s, preferably 3 to 8 dPa·s, and more preferably 3 to 6 dPa·s. Having a viscosity falling within this range facilitates the molding of glass melt gobs of weight corresponding to individual preforms.

The optical glass of the present invention is suitable as a material for various optical elements, such as the lenses of image pickup optical systems.

The optical glass of the present invention exhibits a negative partial variance. The partial variance ratio of Pg and F is a distribution centered about a range of 0.560 to 0.595. The desirable range of Pg and F is 0.566 to 0.590, preferably 0.570-0.585. Lenses having negative refractive power such as concave meniscus lenses, biconcave lenses, and plano-concave lenses can be manufactured from the optical glass of the present invention, and optical systems having extremely good chromatic aberration-correcting capability can be provided by combination with other lenses.

The method for manufacturing optical lenses of the present invention will be described next. The optical lens of the present invention can be manufactured by heating and melting glass starting materials. Glass starting materials in the form of carbonates, nitrates, oxides, and the like can be suitably employed. These starting materials are weighed out in prescribed proportions and mixed to obtain a starting material blend. This blend is then introduced into a melting furnace that has been heated to 1,250 to 1,350° C., for example. The blend is then melted, clarified, stirred, and homogenized to obtain a homogenous glass melt containing no bubbles or undissolved matter. The glass melt is then molded and gradually cooled to obtain the optical glass of the present invention.

[Preform for Precision Press Molding and Method for Manufacturing the Same]

The preform for precision press molding and the method for manufacturing this preform of the present invention will be described next. The preform is a molded glass member equal in weight to a precision press molded article. The preform is formed into a suitable shape based on the shape of the precision press molded article. For example, the preform may be spherical or spheroidal in shape. The preform is heated to a viscosity permitting precision press molding and employed in precision press molding.

The preform for precision press molding of the present invention is comprised of the above-described optical glass of the present invention. The preform of the present invention can be provided with a thin surface film such as a mold-release film as needed. The preform can be precision press molded into an optical element of desired optical constants. Since the stability of the glass in the high temperature range is good and the viscosity at outflow of the glass melt can be increased, there are advantages in that it is possible to manufacture high quality preforms with good productivity by methods of forming preforms by cooling glass gobs obtained by separating a glass melt flowing out of a pipe.

The method for manufacturing preforms for precision press molding of the present invention, one way of manufacturing the preform of the present invention, is a method for manufacturing preforms for precision press molding that are comprised of the optical glass of the present invention by separating glass melt gobs from an outflowing glass melt and forming the glass melt gobs into preforms for precision press molding in a cooling step. Specifically, it is a manufacturing method for molding preforms of prescribed weight by the steps of separating glass melt gobs of prescribed weight from a glass melt flow exiting a pipe or the like and cooling the glass gobs. This method is advantageous in that no mechanical processing such as cutting, grinding, or polishing is required. Mechanically processed preforms must be annealed prior to mechanical processing to reduce distortion of the glass to a degree at which the glass will not be damaged. However, annealing to prevent damage is not required by the above method. Further, preforms with smooth surfaces can also be formed. In this method, from the perspective of imparting smooth, clean surfaces, the preforms are desirably floated by applying wind pressure. Further, the outer surfaces of the preforms are desirably comprised of free surfaces. Still further, preforms free of cutting traces known as shear marks are desirable. Shear marks are produced when the outflowing glass melt is cut with a blade. When shear marks remain at the stage of molding precision press molded articles, they end up becoming defects. Thus, shear marks are desirably removed by the preform stage. Methods of separating glass melt without using a cutting blade and without producing shear marks include: the method of dripping glass melt from an outflow pipe, and the method of supporting the front end portion of a glass melt flow as it flows out of an outflow pipe and removing this support at a timing permitting the separation of a glass melt gob of prescribed weight (referred to as the "drop cut method" hereinafter). In the drop cut method, the glass can be separated at a constriction formed between the front end of the glass melt flow and the end of the outflow pipe to obtain a glass melt gob of prescribed weight. The glass melt gob obtained is then formed while still soft into a suitable shape for feeding into a pressing mold.

The preform of the present invention can be manufactured by preparing a molded glass member from a glass melt and cutting or breaking, grinding, and polishing the molded glass member. In this method, a preform of desired weight is fabricated by molding a molded glass member comprised of the above-described optical glass by causing a glass melt to flow into a casting mold, and then mechanically processing the molded glass member. Prior to conducting mechanical processing, relatively thorough processing to relieve distortion is desirably conducted by annealing the glass to prevent damaging the glass.

[Optical Element and Method for Manufacturing the Same]

The optical element of the present invention is comprised of the above-described optical glass of the present invention. The optical element of the present invention is characterized by a high refractive index and low dispersion in the same manner as the optical glass of the present invention constituting the optical element.

Examples of the optical element of the present invention are various lenses such as spherical lenses, aspherical lenses, and microlenses; diffraction gratings; lenses with diffraction gratings; lens arrays; and prisms. From the viewpoint of applications, examples are: the lenses constituting image pickup optical systems such as digital still cameras, digital video cameras, single-lens reflex cameras, cameras mounted on portable telephones, and vehicle-mounted cameras; and lenses constituting optical systems for reading and writing data to and from optical disks such as DVDs and CDs (for example, the above-described objective lenses).

The above-described optical element is desirably obtained by heat softening and precision press molding the preform of the present invention.

As needed, an optical thin film such as an antireflective film, fully reflective film, partially reflective film, or a film having spectral properties may be provided on the optical element.

The method for manufacturing optical elements of the present invention will be described next.

In the method for manufacturing optical elements of the present invention, the preform of the present invention or a preform for precision press molding manufactured by the method for manufacturing preforms of the present invention is heated and precision press molded to produce an optical element.

Precision press molding methods, also known as mold optics molding, are already well known in the technical field to which the present invention belongs.

Any surface of an optical element that passes, refracts, diffracts, or reflects light rays is called an optically functional surface. In the example of lenses, lens surfaces such as the aspherical surface of an aspherical lens and the spherical surface of a spherical lens correspond to optically functional surfaces. Precision press molding is a method of press molding optically functional surfaces by precisely transferring the molding surface of the pressing mold to the glass. There is no need for mechanical processing such as grinding or polishing to finish optically functional surfaces.

Accordingly, the method for manufacturing optical elements of the present invention is suited to the manufacturing of lenses, lens arrays, diffraction gratings, prisms, and the like. It is particularly suited to manufacturing aspherical lenses with high productivity.

The method for manufacturing optical elements of the present invention permits the manufacturing of optical elements having the above-described optical characteristics. Since it employs preforms comprised of optical glass having a low temperature softening property, the press molding of glass can be conducted at relatively low temperature. Thus, the load on the molding surface of the pressing mold is reduced and the service lifetime of the pressing mold (the mold-release film when a mold-release film is provided on the molding surface) is extended. Since the glass constituting the preform is of high stability, devitrification of the glass can be effectively prevented during reheating and the pressing step. A whole series of steps for obtaining the final product from the glass melt can be conducted with high productivity.

A known pressing mold, such as a pressing mold made of silicon carbide, an ultrahard material, or stainless steel on the molding surface of which has been provided a mold-release film can be employed in precision press molding. Carbon-containing films, rare metal alloy films, and the like can be employed as the mold-release film. The pressing mold is equipped with an upper mold and a lower mold, as well as a sleeve when needed. Of these, to effectively minimize or prevent damage of the molded glass article during press molding, the use of a silicon carbide pressing mold or an ultrahard alloy pressing mold (particularly a pressing mold made of an ultrahard alloy not containing binder, such as a WC pressing mold) is desirably employed. It is also desirable for a carbon-containing film to be provided as a mold-release film on the molding surface of the mold.

In precision press molding, the atmosphere during molding is desirably replaced with a nonoxidizing gas to maintain the molding surfaces of the pressing mold in top condition. Desirable nonoxidizing gases are nitrogen and mixed gases of nitrogen and hydrogen. In particular, when employing a pressing mold the molding surfaces of which have been equipped with a mold-release film in the form of a carbon-containing film, and when employing a pressing mold comprised of silicon carbide, it is necessary to conduct precision press molding in the above-described nonoxidizing atmosphere.

A precision press molding method that is particularly suited to the method for manufacturing an optical element of the present invention will be described next.

(Precision Press Molding Method 1)

In this method, a preform is introduced into the pressing mold, the pressing mold and the preform are both heated, and precision press molding is conducted (referred to as Precision Press Molding Method 1).

In Precision Press Molding Method 1, both the temperature of the pressing mold and the preform are desirably increased to a temperature at which the glass constituting the preform exhibits a viscosity of $10^6$ to $10^{12}$ dPa·s and precision press molding is conducted.

The precision press molded article is desirably removed from the pressing mold once the glass has been cooled to a temperature at which it exhibits a viscosity of $10^{12}$ dPa·s or greater, preferably $10^{14}$ dPa·s or greater, and more preferably, $10^{16}$ dPa·s or greater.

The above-described conditions permit the precise transfer of the shape of the molding surfaces of the pressing mold to the glass, as well as permitting removal of the precision press molded article without distortion.

(Precision Press Molding Method 2)

This method is characterized in that a preform for precision press molding is heated, introduced into a preheated pressing mold, and precision press molded (referred to as "Precision Press Molding Method 2" below). This method permits the manufacturing of optical elements of good surface precision that are free of defects with a shortened cycle time because the preform is preheated prior to being introduced into the pressing mold.

The temperature to which the pressing mold is preheated is desirably lower than the temperature to which the preform is preheated. Since such preheating keeps the heating temperature of the pressing mold down, wear and tear on the pressing mold is reduced.

In Precision Press Molding Method 2, the preform is desirably preheated to a temperature at which the glass constituting the preform exhibits a viscosity of $10^9$ dPa·s or lower, preferably $10^9$ dPa·s.

It is also desirable for the preform to be preheated while being floated, and preferable for preheating to be conducted so that the glass constituting the preform exhibits a viscosity of $10^{5.5}$ to $10^9$ dPa·s, preferably $10^{5.5}$ dPa·s or greater but less than $10^9$ dPa·s.

It is desirable for cooling of the glass to begin simultaneously with the start of pressing or during pressing.

The temperature of the pressing mold is desirably adjusted to be lower than the temperature to which the preform is preheated; a temperature at which the glass exhibits a viscosity of $10^9$ to $10^{12}$ dPa·s may be employed as a yardstick.

In this method, after press molding, the mold is desirably released following cooling to a temperature at which the glass exhibits a viscosity of $10^{12}$ dPa·s or greater. The precision press-molded optical element is removed from the pressing mold and gradually cooled as needed. When the molded article is an optical element such as a lens, the surface thereof can be coated with an optical thin film as needed.

The present invention provides an optical glass having a refractive index nd of not less than 1.87, an Abbé number nu(v)d of not less than 35 but less than 40, a dependence on viscosity permitting ready molding of preforms, and a low temperature softening property (permitting precision press molding with good productivity); and exhibiting good glass stability. The present invention further provides a preform for precision press molding comprised of this glass, and a method for manufacturing an optical element comprised of this glass.

EXAMPLES

The present invention is further described below through embodiments. However, the present invention is not limited to those shown in the embodiments.

Manufacturing Optical Glass

Table 1 gives glass compositions. For each of these glasses, starting materials of the various components in the form of corresponding oxides, hydroxides, carbonates, and nitrates were weighed out to yield the compositions shown in Table 1 following vitrification, thoroughly mixed, charged to a platinum crucible, melted at a temperature range of from 1,250 to 1,350° C. in an electric furnace, homogenized by stirring, and clarified. They were then cast into a metal mold that had been preheated to suitable temperature. The cast glass was cooled to the glass transition temperature and then immediately placed in an annealing furnace, where it was gradually cooled to room temperature to obtain the various optical glasses.

The refractive index (nd), Abbé number (nu(v)d), glass transition temperature, and liquid phase temperature of the various glasses obtained by the above method were measured by the following methods. The results are given in Table 1.

(1) Refractive Index (nd) and Abbé Number (nu(v)d)

Measured for optical glasses obtained by cooling at a gradual temperature reduction rate of 30° C./hour.

(2) Glass Transition Temperature (Tg) and Yield Point (Ts)

Measured at a rate of temperature increase of 4° C./minute with a thermomechanical analyzer made by Rikagu Denki K.K.

(3) Liquid Phase Temperature (L.T.)

Roughly 50 gram glass samples were charged to a platinum crucible and melted for about 15 to 60 minutes at about 1,250 to 1,350° C. The glass samples were then maintained for about 2 hours at 1030° C., 1040° C., 1050° C., 1060° C., 1070° C., 1080° C., 1090° C., and 1100° C., respectively; and cooled while observing with a microscope whether or not crystals precipitated. The lowest temperature at which crystals were not observed was adopted as the liquid phase temperature (L.T.).

(4) Viscosity at Liquid Phase Temperature (eta)

The viscosity was measured by a viscosity measurement method based on a coaxial double barrel rotating viscometer according to JIS Standard Z8803.

(5) Specific Transmittances (lambda 80, lambda 70, lambda 5)

Tabular glass samples 10 mm±0.1 mm in thickness with two mutually parallel surfaces that had been polished smooth were prepared. Light was directed vertically onto a polished surface and the spectral transmittance, including surface reflection loss, was measured over a wavelength range of 280 to 700 nm. The wavelength at which the spectral transmittance became 80 percent was adopted as the lambda 80, the wavelength at which it became 70 percent as the lambda 70, and the wavelength at which it became 5 percent as the lambda 5.

(6) Specific Gravity (d)

Measured by Archimedes' Method.

All of the glasses exhibited glass transition temperatures of 630° C. or less, yield points of 675° C. or less, and good precision press molding characteristics.

TABLE 1

| No. | | Example 1 | | Example 2 | | Example 3 | | Example 4 | |
|---|---|---|---|---|---|---|---|---|---|
| | | mol % | wt % | mol % | wt % | mol % | wt % | mol % | wt % |
| $B_2O_3$ | | 29.46 | 13.32 | 29.46 | 13.27 | 29.46 | 13.23 | 29.23 | 13.25 |
| $SiO_2$ | | 7.75 | 3.02 | 7.75 | 3.01 | 7.75 | 3.01 | 7.69 | 3.01 |
| $Li_2O$ | | 1.55 | 0.30 | 0.00 | 0.00 | 0.00 | 0.00 | 0.77 | 0.15 |
| $Na_2O$ | | 0.00 | 0.00 | 1.55 | 0.62 | 0.00 | 0.00 | 0.00 | 0.00 |
| $K_2O$ | | 0.00 | 0.00 | 0.00 | 0.00 | 1.55 | 0.94 | 0.00 | 0.00 |
| MgO | | 0.00 | 0.00 | 0.00 | 0.00 | 0.00 | 0.00 | 0.00 | 0.00 |
| CaO | | 0.00 | 0.00 | 0.00 | 0.00 | 0.00 | 0.00 | 0.00 | 0.00 |
| SrO | | 0.00 | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 23.26 | 12.29 | 23.26 | 12.25 | 23.26 | 12.21 | 24.62 | 13.05 |
| $La_2O_3$ | | 15.50 | 32.80 | 15.50 | 32.69 | 15.50 | 32.59 | 16.15 | 34.27 |
| $Gd_2O_3$ | | 4.65 | 10.95 | 4.65 | 10.91 | 4.65 | 10.88 | 3.85 | 9.08 |
| $TiO_2$ | | 1.55 | 0.80 | 1.55 | 0.80 | 1.55 | 0.80 | 1.54 | 0.80 |
| $ZrO_2$ | | 4.65 | 3.72 | 4.65 | 3.71 | 4.65 | 3.70 | 4.62 | 3.70 |
| $Ta_2O_5$ | | 3.88 | 11.12 | 3.88 | 11.09 | 3.88 | 11.05 | 3.85 | 11.07 |
| $WO_3$ | | 7.75 | 11.67 | 7.75 | 11.63 | 7.75 | 11.60 | 7.69 | 11.61 |
| Total | | 100.0 | 100.0 | 100.0 | 100.0 | 100.0 | 100.0 | 100.0 | 100.0 |
| $3 \times Li_2O + ZnO$ (mol %) | | 27.91 | | 23.26 | | 23.26 | | 26.93 | |
| $La_2O_3 + Gd_2O_3$ (mol %) | | 20.15 | | 20.15 | | 20.15 | | 20.00 | |
| $La_2O_3/\Sigma Re_2O_3$ (mol %) | | 0.77 | | 0.77 | | 0.77 | | 0.81 | |
| $Ta_2O_5 + WO_3$ (mol %) | | 11.63 | | 11.63 | | 11.63 | | 11.54 | |
| $Ta_2O_5/Gd_2O_3$ (mol %) | | 0.83 | | 0.83 | | 0.83 | | 1.00 | |
| $Ta_2O_5/WO_3$ (mol %) | | 0.50 | | 0.50 | | 0.50 | | 0.50 | |
| Tg(° C.) | | 602 | | 611 | | 620 | | 608 | |
| Ts(° C.) | | 645 | | 654 | | 663 | | 650 | |
| LT(° C.) | | 1060 | | 1080 | | 1080 | | 1070 | |
| d(g/cc) | | 5.415 | | 5.388 | | 5.347 | | 5.407 | |
| nd | | 1.88173 | | 1.87582 | | 1.87036 | | 1.88297 | |
| vd | | 37.08 | | 37.08 | | 37.19 | | 37.01 | |
| $\eta$(dPa·s) | | 4 | | 3 | | 3 | | 4 | |
| Specific transmittance Wavelength(nm) | $\lambda 80$ | 434 | | 435 | | 440 | | 440 | |
| | $\lambda 70$ | 386 | | 386 | | 387 | | 387 | |
| | $\lambda 5$ | 350 | | 350 | | 350 | | 351 | |

TABLE 1-continued

|  |  | Example 5 | | Example 6 | | Example 7 | | Example 8 | |
| --- | --- | --- | --- | --- | --- | --- | --- | --- | --- |
| No. | | mol % | wt % | mol % | wt % | mol % | wt % | mol % | wt % |
| B2O3 | | 28.24 | 12.85 | 27.27 | 12.49 | 28.24 | 12.86 | 28.46 | 12.96 |
| SiO2 | | 9.16 | 3.60 | 10.61 | 4.19 | 9.16 | 3.60 | 9.23 | 3.63 |
| Li2O | | 0.76 | 0.15 | 0.76 | 0.15 | 0.76 | 0.15 | 1.54 | 0.30 |
| Na2O | | 0.00 | 0.00 | 0.00 | 0.00 | 0.00 | 0.00 | 0.00 | 0.00 |
| K2O | | 0.00 | 0.00 | 0.00 | 0.00 | 0.00 | 0.00 | 0.00 | 0.00 |
| MgO | | 0.00 | 0.00 | 0.00 | 0.00 | 0.00 | 0.00 | 0.00 | 0.00 |
| CaO | | 0.00 | 0.00 | 0.00 | 0.00 | 0.00 | 0.00 | 0.00 | 0.00 |
| SrO | | 0.00 | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 24.43 | 12.99 | 24.24 | 12.98 | 24.43 | 13.00 | 23.08 | 12.28 |
| La2O3 | | 15.27 | 32.50 | 15.91 | 34.10 | 15.65 | 33.34 | 16.15 | 34.42 |
| Gd2O3 | | 4.58 | 10.85 | 3.79 | 9.03 | 4.20 | 9.95 | 3.85 | 9.12 |
| TiO2 | | 1.53 | 0.80 | 1.52 | 0.80 | 1.53 | 0.80 | 1.54 | 0.80 |
| ZrO2 | | 4.58 | 3.69 | 4.55 | 3.69 | 4.58 | 3.69 | 4.62 | 3.72 |
| Ta2O5 | | 3.82 | 11.02 | 3.79 | 11.01 | 3.82 | 11.03 | 3.85 | 11.11 |
| WO3 | | 7.63 | 11.56 | 7.58 | 11.56 | 7.63 | 11.57 | 7.69 | 11.66 |
| Total | | 100.0 | 100.0 | 100.0 | 100.0 | 100.0 | 100.0 | 100.0 | 100.0 |
| 3 × Li2O + ZnO (mol %) | | 26.71 | | 26.52 | | 26.71 | | 27.7 | |
| La2O3 + Gd2O3 (mol %) | | 19.85 | | 19.70 | | 19.85 | | 20.00 | |
| La2O3/ΣRe2O3 (mol %) | | 0.77 | | 0.81 | | 0.79 | | 0.81 | |
| Ta2O5 + WO3 (mol %) | | 11.45 | | 11.37 | | 11.45 | | 11.54 | |
| Ta2O5/Gd2O3 (mol %) | | 0.83 | | 1.00 | | 0.91 | | 1.00 | |
| Ta2O5/WO3 (mol %) | | 0.50 | | 0.50 | | 0.50 | | 0.50 | |
| Tg(° C.) | | 612 | | 610 | | 610 | | 603 | |
| Ts(° C.) | | 655 | | 653 | | 657 | | 646 | |
| LT(° C.) | | 1060 | | 1060 | | 1060 | | 1060 | |
| d(g/cc) | | 5.421 | | 5.389 | | 5.409 | | 5.389 | |
| nd | | 1.88071 | | 1.87953 | | 1.88103 | | 1.88029 | |
| vd | | 37.11 | | 37.10 | | 37.08 | | 37.17 | |
| η(dPa · s) | | 4 | | 5 | | 5 | | 4 | |
| Specific transmittance Wavelength(nm) | λ80 | 431 | | 434 | | 428 | | 433 | |
| | λ70 | 387 | | 387 | | 387 | | 386 | |
| | λ5 | 349 | | 351 | | 350 | | 350 | |
|  |  | Example 9 | | Example 10 | | Example 11 | | Example 12 | |
| No. | | mol % | wt % | mol % | wt % | mol % | wt % | mol % | wt % |
| B2O3 | | 28.91 | 13.13 | 29.37 | 13.31 | 28.52 | 13.17 | 29.12 | 13.21 |
| SiO2 | | 9.38 | 3.68 | 9.52 | 3.73 | 9.13 | 3.64 | 7.66 | 3.00 |
| Li2O | | 3.13 | 0.61 | 4.76 | 0.93 | 0.76 | 0.15 | 0.38 | 0.07 |
| Na2O | | 0.00 | 0.00 | 0.00 | 0.00 | 0.00 | 0.00 | 0.00 | 0.00 |
| K2O | | 0.00 | 0.00 | 0.00 | 0.00 | 0.00 | 0.00 | 0.00 | 0.00 |
| MgO | | 0.00 | 0.00 | 0.00 | 0.00 | 0.00 | 0.00 | 0.00 | 0.00 |
| CaO | | 0.00 | 0.00 | 0.00 | 0.00 | 0.00 | 0.00 | 0.00 | 0.00 |
| SrO | | 0.00 | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 20.31 | 10.79 | 17.46 | 9.25 | 24.33 | 13.14 | 25.29 | 13.41 |
| La2O3 | | 16.41 | 34.88 | 16.67 | 35.36 | 15.59 | 33.69 | 16.09 | 34.16 |
| Gd2O3 | | 3.91 | 9.24 | 3.97 | 9.37 | 3.42 | 8.23 | 3.83 | 9.05 |
| TiO2 | | 1.56 | 0.81 | 1.59 | 0.83 | 1.52 | 0.81 | 1.53 | 0.80 |
| ZrO2 | | 4.69 | 3.77 | 4.76 | 3.82 | 5.32 | 4.35 | 4.60 | 3.69 |
| Ta2O5 | | 3.91 | 11.26 | 3.97 | 11.42 | 3.80 | 11.14 | 3.83 | 11.03 |
| WO3 | | 7.81 | 11.82 | 7.94 | 11.98 | 7.60 | 11.69 | 7.66 | 11.58 |
| Total | | 100.0 | 100.0 | 100.0 | 100.0 | 100.0 | 100.0 | 100.0 | 100.0 |
| 3 × Li2O + ZnO (mol %) | | 29.7 | | 31.74 | | 26.61 | | 26.43 | |
| La2O3 + Gd2O3 (mol %) | | 20.32 | | 20.64 | | 19.01 | | 19.92 | |
| La2O3/ΣRe2O3 (mol %) | | 0.81 | | 0.81 | | 0.82 | | 0.81 | |
| Ta2O5 + WO3 (mol %) | | 11.72 | | 11.91 | | 11.40 | | 11.49 | |
| Ta2O5/Gd2O3 (mol %) | | 1.00 | | 1.00 | | 1.11 | | 1.00 | |
| Ta2O5/Gd2O3 (mol %) | | 0.50 | | 0.50 | | 0.50 | | 0.50 | |

TABLE 1-continued

| | | | | | | | | |
|---|---|---|---|---|---|---|---|---|
| Tg(° C.) | | 596 | | 589 | | 614 | | 612 |
| Ts(° C.) | | 638 | | 632 | | 657 | | 655 |
| LT(° C.) | | 1070 | | 1080 | | 1070 | | 1060 |
| d(g/cc) | | 5.361 | | 5.327 | | 5.355 | | 5.423 |
| nd | | 1.87788 | | 1.87528 | | 1.79949 | | 1.88331 |
| vd | | 37.36 | | 37.42 | | 36.98 | | 37.04 |
| η(dPa·s) | | 3 | | 3 | | 3 | | 4 |
| Specific | λ80 | 427 | | 422 | | 427 | | 445 |
| transmittance | λ70 | 385 | | 383 | | 387 | | 388 |
| Wavelength(nm) | λ5 | 347 | | 346 | | 350 | | 351 |

| | | Example 13 | | Example 14 | | Example 15 | | Example 16 | |
|---|---|---|---|---|---|---|---|---|---|
| No. | | mol % | wt % | mol % | wt % | mol % | wt % | mol % | wt % |
| B2O3 | | 29.12 | 13.22 | 28.63 | 13.02 | 28.79 | 13.33 | 29.01 | 13.34 |
| SiO2 | | 7.66 | 3.00 | 8.40 | 3.30 | 7.58 | 3.03 | 7.63 | 3.03 |
| Li2O | | 0.38 | 0.07 | 0.38 | 0.07 | 0.00 | 0.00 | 0.00 | 0.00 |
| Na2O | | 0.00 | 0.00 | 0.00 | 0.00 | 0.00 | 0.00 | 0.00 | 0.00 |
| K2O | | 0.00 | 0.00 | 0.00 | 0.00 | 0.00 | 0.00 | 0.00 | 0.00 |
| MgO | | 0.00 | 0.00 | 0.00 | 0.00 | 0.00 | 0.00 | 0.00 | 0.00 |
| CaO | | 0.00 | 0.00 | 0.00 | 0.00 | 0.00 | 0.00 | 0.00 | 0.00 |
| SrO | | 0.00 | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 26.05 | 13.83 | 25.57 | 13.60 | 27.27 | 14.76 | 27.48 | 14.77 |
| La2O3 | | 15.71 | 33.39 | 15.65 | 33.31 | 15.15 | 32.82 | 15.27 | 32.86 |
| Gd2O3 | | 4.21 | 9.97 | 4.20 | 9.94 | 4.55 | 10.96 | 4.58 | 10.97 |
| TiO2 | | 1.53 | 0.80 | 1.53 | 0.80 | 1.52 | 0.80 | 1.53 | 0.81 |
| ZrO2 | | 3.83 | 3.08 | 4.20 | 3.38 | 4.55 | 3.72 | 4.58 | 3.73 |
| Ta2O5 | | 3.83 | 11.04 | 3.82 | 11.02 | 3.03 | 8.90 | 3.82 | 11.14 |
| WO3 | | 7.66 | 11.59 | 7.63 | 11.56 | 7.58 | 11.68 | 6.11 | 9.35 |
| Total | | 100.0 | 100.0 | 100.0 | 100.0 | 100.0 | 100.0 | 100.0 | 100.0 |
| 3 × Li2O + ZnO (mol %) | | 27.19 | | 26.71 | | 27.27 | | 27.48 | |
| La2O3 + Gd2O3 (mol %) | | 19.92 | | 19.85 | | 19.70 | | 19.85 | |
| La2O3/ΣRe2O3 (mol %) | | 0.79 | | 0.79 | | 0.77 | | 0.77 | |
| Ta2O5 + WO3 (mol %) | | 11.49 | | 11.45 | | 10.61 | | 9.93 | |
| Ta2O5/Gd2O3 (mol %) | | 0.91 | | 0.91 | | 0.67 | | 0.83 | |
| Ta2O5/Gd2O3 (mol %) | | 0.50 | | 0.50 | | 0.40 | | 0.63 | |
| Tg(° C.) | | 611 | | 613 | | 613 | | 614 | |
| Ts(° C.) | | 654 | | 656 | | 655 | | 657 | |
| LT(° C.) | | 1050 | | 1050 | | 1070 | | 1080 | |
| d(g/cc) | | 5.426 | | 5.418 | | 5.406 | | 5.414 | |
| nd | | 1.88095 | | 1.88093 | | 1.87925 | | 1.87932 | |
| vd | | 37.01 | | 37.00 | | 37.18 | | 37.45 | |
| η(dPa·s) | | 5 | | 5 | | 3 | | 3 | |
| Specific | λ80 | 433 | | 434 | | 441 | | 437 | |
| transmittance | λ70 | 386 | | 387 | | 388 | | 386 | |
| Wavelength(nm) | λ5 | 351 | | 350 | | 352 | | 350 | |

| | | Example 17 | | Example 18 | | Example 19 | | Example 20 | |
|---|---|---|---|---|---|---|---|---|---|
| No. | | mol % | wt % | mol % | wt % | mol % | wt % | mol % | wt % |
| B2O3 | | 29.01 | 13.19 | 28.57 | 13.39 | 28.57 | 12.99 | 29.01 | 13.17 |
| SiO2 | | 7.63 | 3.00 | 7.52 | 3.04 | 7.52 | 2.95 | 7.63 | 2.99 |
| Li2O | | 0.00 | 0.00 | 0.00 | 0.00 | 0.00 | 0.00 | 0.00 | 0.00 |
| Na2O | | 0.00 | 0.00 | 0.00 | 0.00 | 0.00 | 0.00 | 0.00 | 0.00 |
| K2O | | 0.00 | 0.00 | 0.00 | 0.00 | 0.00 | 0.00 | 0.00 | 0.00 |
| MgO | | 0.00 | 0.00 | 0.00 | 0.00 | 0.00 | 0.00 | 0.00 | 0.00 |
| CaO | | 0.00 | 0.00 | 0.00 | 0.00 | 0.00 | 0.00 | 0.00 | 0.00 |
| SrO | | 0.00 | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 26.72 | 14.21 | 25.56 | 14.00 | 25.56 | 13.58 | 25.95 | 13.77 |
| La2O3 | | 16.03 | 34.12 | 14.29 | 31.32 | 14.29 | 30.39 | 16.03 | 34.05 |
| Gd2O3 | | 3.82 | 9.04 | 3.76 | 9.17 | 3.76 | 8.90 | 3.82 | 9.02 |
| TiO2 | | 1.53 | 0.80 | 4.51 | 2.43 | 1.50 | 0.78 | 1.53 | 0.80 |
| ZrO2 | | 3.82 | 3.07 | 4.51 | 3.74 | 4.51 | 3.63 | 4.58 | 3.68 |
| Ta2O5 | | 3.82 | 11.02 | 3.76 | 11.18 | 3.76 | 10.85 | 3.82 | 11.00 |
| WO3 | | 7.63 | 11.56 | 7.52 | 11.73 | 10.53 | 15.93 | 7.63 | 11.54 |
| Total | | 100.0 | 100.0 | 100.0 | 100.0 | 100.0 | 100.0 | 100.0 | 100.0 |

TABLE 1-continued

| | | | | | |
|---|---|---|---|---|---|
| 3 × Li2O + ZnO (mol %) | | 26.72 | 25.56 | 25.56 | 25.95 |
| La2O3 + Gd2O3 (mol %) | | 19.85 | 18.05 | 18.05 | 19.85 |
| La2O3/ΣRe2O3 (mol %) | | 0.81 | 0.79 | 0.79 | 0.81 |
| Ta2O5 + WO3 (mol %) | | 11.45 | 11.28 | 14.29 | 11.45 |
| Ta2O5/Gd2O3 (mol %) | | 1.00 | 1.00 | 1.00 | 1.00 |
| Ta2O5/Gd2O3 (mol %) | | 0.50 | 0.50 | 0.36 | 0.50 |
| Tg(° C.) | | 615 | 615 | 609 | 614 |
| Ts(° C.) | | 658 | 658 | 652 | 657 |
| LT(° C.) | | 1050 | 1080 | 1060 | 1060 |
| d(g/cc) | | 5.424 | 5.341 | 5.423 | 5.414 |
| nd | | 1.88122 | 1.88974 | 1.88542 | 1.88309 |
| vd | | 36.96 | 35.51 | 35.80 | 36.96 |
| η(dPa · s) | | 5 | 3 | 4 | 4 |
| Specific transmittance Wavelength(nm) | λ80 | 440 | 456 | 449 | 437 |
| | λ70 | 390 | 394 | 392 | 387 |
| | λ5 | 350 | 356 | 356 | 352 |

| | | Example 21 | | Example 22 | | Example 23 | | Example 24 | |
|---|---|---|---|---|---|---|---|---|---|
| No. | | mol % | wt % | mol % | wt % | mol % | wt % | mol % | wt % |
| B2O3 | | 29.01 | 12.98 | 29.01 | 13.11 | 29.01 | 13.23 | 29.01 | 13.27 |
| SiO2 | | 7.63 | 2.95 | 7.63 | 2.98 | 7.63 | 3.01 | 7.63 | 3.01 |
| Li2O | | 0.00 | 0.00 | 0.00 | 0.00 | 0.00 | 0.00 | 0.00 | 0.00 |
| Na2O | | 0.00 | 0.00 | 0.00 | 0.00 | 0.00 | 0.00 | 0.00 | 0.00 |
| K2O | | 0.00 | 0.00 | 0.00 | 0.00 | 0.00 | 0.00 | 0.00 | 0.00 |
| MgO | | 0.00 | 0.00 | 0.00 | 0.00 | 0.00 | 0.00 | 0.00 | 0.00 |
| CaO | | 0.00 | 0.00 | 0.00 | 0.00 | 3.05 | 1.12 | 0.00 | 0.00 |
| SrO | | 0.00 | 0.00 | 3.05 | 2.05 | 0.00 | 0.00 | 0.00 | 0.00 |
| BaO | | 3.05 | 3.01 | 0.00 | 0.00 | 0.00 | 0.00 | 0.00 | 0.00 |
| ZnO | | 22.90 | 11.98 | 22.90 | 12.10 | 22.90 | 12.21 | 22.90 | 12.25 |
| La2O3 | | 16.03 | 33.57 | 16.03 | 33.90 | 16.03 | 34.22 | 16.03 | 34.33 |
| Gd2O3 | | 3.82 | 8.89 | 3.82 | 8.98 | 3.82 | 9.07 | 3.82 | 9.09 |
| TiO2 | | 1.53 | 0.78 | 1.53 | 0.79 | 1.53 | 0.80 | 1.53 | 0.80 |
| ZrO2 | | 4.58 | 3.63 | 4.58 | 3.66 | 4.58 | 3.70 | 4.58 | 3.71 |
| Ta2O5 | | 3.82 | 10.84 | 3.82 | 10.95 | 3.82 | 11.05 | 3.82 | 11.09 |
| WO3 | | 7.63 | 11.37 | 7.63 | 11.49 | 7.63 | 11.60 | 7.63 | 11.63 |
| Total | | 100.0 | 100.0 | 100.0 | 100.0 | 100.0 | 100.0 | 100.0 | 100.0 |
| 3 × Li2O + ZnO (mol %) | | 22.9 | | 22.9 | | 22.9 | | 22.9 | |
| La2O3 + Gd2O3 (mol %) | | 19.85 | | 19.85 | | 19.85 | | 19.85 | |
| La2O3/ΣRe2O3 (mol %) | | 0.81 | | 0.81 | | 0.81 | | 0.81 | |
| Ta2O5 + WO3 (mol %) | | 11.45 | | 11.45 | | 11.45 | | 11.45 | |
| Ta2O5/Gd2O3 (mol %) | | 1.00 | | 1.00 | | 1.00 | | 1.00 | |
| Ta2O5/Gd2O3 (mol %) | | 0.50 | | 0.50 | | 0.50 | | 0.50 | |
| Tg(° C.) | | 623 | | 621 | | 622 | | 621 | |
| Ts(° C.) | | 666 | | 664 | | 665 | | 664 | |
| LT(° C.) | | 1080 | | 1080 | | 1080 | | 1080 | |
| d(g/cc) | | 5.441 | | 5.418 | | 5.387 | | 5.394 | |
| nd | | 1.88028 | | 1.88033 | | 1.88056 | | 1.88049 | |
| vd | | 37.21 | | 37.19 | | 37.08 | | 37.09 | |
| η(dPa · s) | | 3 | | 3 | | 3 | | 3 | |
| Specific transmittance Wavelength(nm) | λ80 | 440 | | 440 | | 435 | | 432 | |
| | λ70 | 386 | | 387 | | 387 | | 389 | |
| | λ5 | 350 | | 351 | | 349 | | 350 | |

| | | Example 25 | | Example 26 | | Example 27 | | Example 28 | |
|---|---|---|---|---|---|---|---|---|---|
| No. | | mol % | wt % | mol % | wt % | mol % | wt % | mol % | wt % |
| B2O3 | | 29.4 | 13.3 | 29.9 | 13.4 | 29.5 | 13.1 | 29.1 | 13.0 |
| SiO2 | | 7.8 | 3.0 | 7.8 | 3.0 | 7.8 | 3.0 | 7.6 | 2.9 |
| Li2O | | 0.0 | 0.0 | 0.0 | 0.0 | 0.0 | 0.0 | 0.0 | 0.0 |
| Na2O | | 0.0 | 0.0 | 0.0 | 0.0 | 0.0 | 0.0 | 0.0 | 0.0 |
| K2O | | 0.0 | 0.0 | 0.0 | 0.0 | 0.0 | 0.0 | 0.0 | 0.0 |
| MgO | | 0.0 | 0.0 | 0.0 | 0.0 | 0.0 | 0.0 | 0.0 | 0.0 |
| CaO | | 0.0 | 0.0 | 0.0 | 0.0 | 0.0 | 0.0 | 0.0 | 0.0 |

TABLE 1-continued

| | | | | | | | | |
|---|---|---|---|---|---|---|---|---|
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| ZnO | 27.0 | 14.2 | 25.9 | 13.5 | 25.7 | 13.3 | 26.7 | 14.1 |
| La2O3 | 16.3 | 34.4 | 16.5 | 34.5 | 16.3 | 34.0 | 16.0 | 33.6 |
| Gd2O3 | 3.9 | 9.1 | 3.9 | 9.1 | 3.9 | 9.0 | 3.8 | 8.9 |
| HfO2 | 0.0 | 0.0 | 0.0 | 0.0 | 0.0 | 0.0 | 0.0 | 0.0 |
| TiO2 | 0.0 | 0.0 | 0.0 | 0.0 | 0.0 | 0.0 | 0.0 | 0.0 |
| ZrO2 | 3.9 | 3.1 | 3.9 | 3.1 | 3.9 | 3.1 | 3.8 | 3.0 |
| Ta2O5 | 3.9 | 11.2 | 3.9 | 11.1 | 3.9 | 11.0 | 3.8 | 10.8 |
| Nb2O5 | 0.0 | 0.0 | 0.4 | 0.7 | 0.4 | 0.7 | 0.0 | 0.0 |
| WO3 | 7.8 | 11.7 | 7.8 | 11.6 | 8.6 | 12.8 | 9.2 | 13.7 |
| Total | 100.0 | 100.0 | 100.0 | 100.0 | 100.0 | 100.0 | 100.0 | 100.0 |
| 3 × Li2O + ZnO (mol %) | 27.0 | | 25.9 | | 25.7 | | 26.7 | |
| La2O3 + Gd2O3 (mol %) | 20.2 | | 20.4 | | 20.2 | | 19.8 | |
| La2O3/ΣRe2O3 (mol %) | 0.81 | | 0.81 | | 0.81 | | 0.81 | |
| Ta2O5 + WO3 (mol %) | 11.70 | | 11.70 | | 12.50 | | 13.00 | |
| Ta2O5/Gd2O3 (mol %) | 1.00 | | 1.00 | | 1.00 | | 1.00 | |
| Ta2O5/WO3 (mol %) | 0.50 | | 0.50 | | 0.45 | | 0.41 | |
| Tg(° C.) | 616 | | 614 | | 621 | | 614 | |
| Ts(° C.) | 659 | | 657 | | 664 | | 657 | |
| LT(° C.) | 1070 | | 1070 | | 1080 | | 1080 | |
| d(g/cc) | 5.44 | | 5.44 | | 5.44 | | 5.48 | |
| nd | 1.87618 | | 1.87838 | | 1.88063 | | 1.88 | |
| vd | 37.83 | | 37.54 | | 37.2 | | 37.1 | |
| η(dPa·s) | 3.5 | | 3.5 | | 3.0 | | 3.0 | |
| Specific transmittance Wavelength(nm) λ80 | 434 | | 433 | | 445 | | 451 | |
| λ70 | 384 | | 384 | | 387 | | 390 | |
| λ5 | 349 | | 350 | | 350 | | 349 | |

| | Example 29 | | Example 30 | | Example 31 | | Example 32 | |
|---|---|---|---|---|---|---|---|---|
| No. | mol % | wt % | mol % | wt % | mol % | wt % | mol % | wt % |
| B2O3 | 29.1 | 13.1 | 29.2 | 13.1 | 29.0 | 13.0 | 29.5 | 13.2 |
| SiO2 | 7.6 | 2.9 | 7.7 | 3.0 | 7.6 | 2.9 | 6.9 | 2.7 |
| Li2O | 0.0 | 0.0 | 0.0 | 0.0 | 0.0 | 0.0 | 0.0 | 0.0 |
| Na2O | 0.0 | 0.0 | 0.0 | 0.0 | 0.0 | 0.0 | 0.0 | 0.0 |
| K2O | 0.0 | 0.0 | 0.0 | 0.0 | 0.0 | 0.0 | 0.0 | 0.0 |
| MgO | 0.0 | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| ZnO | 26.7 | 14.0 | 26.9 | 14.1 | 26.7 | 14.0 | 26.8 | 14.0 |
| La2O3 | 16.0 | 33.6 | 15.8 | 33.2 | 14.9 | 31.2 | 14.9 | 31.1 |
| Gd2O3 | 3.8 | 8.9 | 4.2 | 9.8 | 4.6 | 10.7 | 4.6 | 10.7 |
| HfO2 | 0.8 | 1.1 | 0.0 | 0.0 | 0.0 | 0.0 | 0.0 | 0.0 |
| TiO2 | 0.0 | 0.0 | 0.0 | 0.0 | 0.0 | 0.0 | 0.0 | 0.0 |
| ZrO2 | 3.8 | 3.0 | 3.8 | 3.0 | 4.1 | 3.2 | 4.1 | 3.2 |
| Ta2O5 | 3.8 | 10.8 | 3.9 | 11.1 | 4.1 | 11.6 | 4.1 | 11.6 |
| Nb2O5 | 0.0 | 0.0 | 0.0 | 0.0 | 0.0 | 0.0 | 0.0 | 0.0 |
| WO3 | 8.4 | 12.6 | 8.5 | 12.7 | 9.0 | 13.4 | 9.1 | 13.5 |
| Total | 100.0 | 100.0 | 100.0 | 100.0 | 100.0 | 100.0 | 100.0 | 100.0 |
| 3 × Li2O + ZnO (mol %) | 26.7 | | 26.9 | | 26.7 | | 26.8 | |
| La2O3 + Gd2O3 (mol %) | 19.8 | | 20 | | 19.5 | | 19.5 | |
| La2O3/ΣRe2O3 (mol %) | 0.81 | | 0.79 | | 0.76 | | 0.76 | |
| Ta2O5 + WO3 (mol %) | 12.20 | | 12.40 | | 13.10 | | 13.20 | |
| Ta2O5/Gd2O3 (mol %) | 1.00 | | 0.93 | | 0.89 | | 0.89 | |
| Ta2O5/WO3 (mol %) | 0.45 | | 0.46 | | 0.46 | | 0.45 | |
| Tg(° C.) | 617 | | 621 | | 618 | | 615 | |
| Ts(° C.) | 660 | | 664 | | 661 | | 658 | |
| LT(° C.) | 1070 | | 1060 | | 1060 | | 1060 | |
| d | 5.48 | | 5.48 | | 5.49 | | 5.50 | |
| nd | 1.87971 | | 1.87786 | | 1.88028 | | 1.88123 | |
| vd | 37.43 | | 37.5 | | 37.03 | | 37.03 | |
| η(dPa·s) | 3.5 | | 3.5 | | 3.5 | | 3.5 | |

TABLE 1-continued

| Specific transmittance Wavelength(nm) | | | | | | | | |
|---|---|---|---|---|---|---|---|---|
| λ80 | 444 | | 445 | | 453 | | 449 | |
| λ70 | 389 | | 389 | | 391 | | 392 | |
| λ5 | 350 | | 349 | | 352 | | 351 | |

| | | Example 33 | | Example 34 | | Example 35 | | Example 36 | |
|---|---|---|---|---|---|---|---|---|---|
| No. | | mol % | wt % | mol % | wt % | mol % | wt % | mol % | wt % |
| B2O3 | | 28.9 | 12.9 | 28.6 | 12.8 | 28.9 | 13.0 | 28.4 | 12.7 |
| SiO2 | | 7.6 | 2.9 | 7.6 | 2.9 | 7.6 | 2.9 | 7.5 | 2.9 |
| Li2O | | 0.0 | 0.0 | 0.0 | 0.0 | 0.0 | 0.0 | 0.0 | 0.0 |
| Na2O | | 0.0 | 0.0 | 0.0 | 0.0 | 0.0 | 0.0 | 0.0 | 0.0 |
| K2O | | 0.0 | 0.0 | 0.0 | 0.0 | 0.0 | 0.0 | 0.0 | 0.0 |
| MgO | | 0.0 | 0.0 | 0.0 | 0.0 | 0.0 | 0.0 | 0.0 | 0.0 |
| CaO | | 0.0 | 0.0 | 0.0 | 0.0 | 0.0 | 0.0 | 0.0 | 0.0 |
| SrO | | 0.0 | 0.0 | 0.0 | 0.0 | 0.0 | 0.0 | 0.0 | 0.0 |
| BaO | | 0.0 | 0.0 | 0.0 | 0.0 | 0.0 | 0.0 | 0.0 | 0.0 |
| ZnO | | 26.6 | 13.9 | 26.4 | 13.9 | 26.5 | 13.8 | 26.3 | 13.8 |
| La2O3 | | 14.8 | 31.0 | 14.0 | 29.3 | 13.6 | 28.6 | 12.0 | 25.1 |
| Gd2O3 | | 4.6 | 10.7 | 4.5 | 10.5 | 4.5 | 10.5 | 4.5 | 10.5 |
| HfO2 | | 0.0 | 0.0 | 0.0 | 0.0 | 0.0 | 0.0 | 0.0 | 0.0 |
| TiO2 | | 0.0 | 0.0 | 0.0 | 0.0 | 0.0 | 0.0 | 0.0 | 0.0 |
| ZrO2 | | 3.8 | 3.0 | 3.8 | 3.0 | 4.5 | 3.6 | 5.1 | 4.0 |
| Ta2O5 | | 3.8 | 10.8 | 3.8 | 10.8 | 4.5 | 12.8 | 5.1 | 14.5 |
| Nb2O5 | | 0.0 | 0.0 | 0.0 | 0.0 | 0.0 | 0.0 | 0.0 | 0.0 |
| WO3 | | 9.9 | 14.8 | 11.3 | 16.8 | 9.9 | 14.8 | 11.1 | 16.5 |
| Total | | 100.0 | 100.0 | 100.0 | 100.0 | 100.0 | 100.0 | 100.0 | 100.0 |
| 3 × Li2O + ZnO (mol %) | | 26.6 | | 26.4 | | 26.5 | | 26.3 | |
| La2O3 + Gd2O3 (mol %) | | 19.4 | | 18.5 | | 18.1 | | 16.5 | |
| La2O3/ΣRe2O3 (mol %) | | 0.76 | | 0.76 | | 0.75 | | 0.73 | |
| Ta2O5 + WO3 (mol %) | | 13.70 | | 15.10 | | 14.40 | | 16.20 | |
| Ta2O5/Gd2O3 (mol %) | | 0.83 | | 0.84 | | 1.00 | | 1.13 | |
| Ta2O5/WO3 (mol %) | | 0.38 | | 0.34 | | 0.45 | | 0.46 | |
| Tg(° C.) | | 611 | | 610 | | 615 | | 614 | |
| Ts(° C.) | | 653 | | 652 | | 657 | | 656 | |
| LT(° C.) | | 1070 | | 1060 | | 1060 | | 1070 | |
| d | | 5.48 | | 5.49 | | 5.50 | | 5.50 | |
| nd | | 1.87973 | | 1.88003 | | 1.88118 | | 1.88323 | |
| vd | | 36.87 | | 36.29 | | 36.47 | | 35.6 | |
| η(dPa · s) | | 3.5 | | 3.5 | | 3.5 | | 3.5 | |
| Specific transmittance Wavelength(nm) | λ80 | 444 | | 451 | | 447 | | 452 | |
| | λ70 | 392 | | 395 | | 392 | | 395 | |
| | λ5 | 352 | | 353 | | 352 | | 353 | |

| | Example 37 | | Example 38 | |
|---|---|---|---|---|
| No. | mol % | wt % | mol % | wt % |
| B2O3 | 28.9 | 12.9 | 29.0 | 12.9 |
| SiO2 | 7.6 | 2.9 | 7.7 | 3.0 |
| Li2O | 0.0 | 0.0 | 0.0 | 0.0 |
| Na2O | 0.0 | 0.0 | 0.0 | 0.0 |
| K2O | 0.0 | 0.0 | 0.0 | 0.0 |
| MgO | 0.0 | 0.0 | 0.0 | 0.0 |
| CaO | 0.0 | 0.0 | 0.0 | 0.0 |
| SrO | 0.0 | 0.0 | 0.0 | 0.0 |
| BaO | 0.0 | 0.0 | 0.0 | 0.0 |
| ZnO | 26.6 | 13.9 | 26.2 | 13.6 |
| La2O3 | 14.5 | 30.4 | 15.0 | 31.2 |
| Gd2O3 | 4.6 | 10.7 | 4.6 | 10.6 |
| HfO2 | 0.0 | 0.0 | 0.0 | 0.0 |
| TiO2 | 0.0 | 0.0 | 0.0 | 0.0 |
| ZrO2 | 4.5 | 3.6 | 4.2 | 3.3 |
| Ta2O5 | 4.3 | 12.2 | 4.2 | 11.9 |
| Nb2O5 | 0.0 | 0.0 | 0.0 | 0.0 |
| WO3 | 9.0 | 13.4 | 9.1 | 13.5 |
| Total | 100.0 | 100.0 | 100.0 | 100.0 |
| 3 × Li2O + ZnO (mol %) | 26.6 | | 26.2 | |
| La2O + Gd2O3 (mol %) | 19.1 | | 19.6 | |

TABLE 1-continued

| | | | |
|---|---|---|---|
| La2O3/ΣRe2O3 (mol %) | | 0.76 | 0.77 |
| Ta2O5 + WO3 (mol %) | | 13.30 | 13.30 |
| Ta2O5/Gd2O3 (mol %) | | 0.93 | 0.91 |
| Ta2O5/WO3 (mol %) | | 0.48 | 0.46 |
| Tg(° C.) | | 616 | 617 |
| Ts(° C.) | | 658 | 659 |
| LT(° C.) | | 1070 | 1060 |
| d | | 5.49 | 5.50 |
| nd | | 1.88059 | 1.88128 |
| νd | | 36.95 | 37.01 |
| η(dPa·s) | | 3.5 | 3.5 |
| Specific transmittance Wavelength(nm) | λ80 | 441 | 438 |
| | λ70 | 392 | 391 |
| | λ5 | 351 | 351 |

Further, all of the glasses exhibited liquid phase temperatures of 1,080° C. or lower, viscosities at liquid phase temperature of 2 dPa·s or greater, and characteristics permitting the molding of preforms by the steps of separation of glass melt gobs from a glass melt, cooling, and solidification.

All of the glasses exhibited good light transmitting properties at visible short wavelengths in the form of a lambda 80 of 460 nm or less, a lambda 70 of 400 nm or less, and a lambda 5 of 365 nm or less. In the visible region, they exhibited transmittance characteristics in the form of a spectral transmittance exceeding 80 percent in the wavelength range above lambda 80. Similarly, in the visible range, they exhibited transmittance characteristics in the form of a spectral transmittance exceeding 70 percent in the wavelength range above lambda 70, and a spectral transmittance exceeding 5 percent in the wavelength range above lambda 5.

All of the glasses had a specific gravity of 5.5 or less. Despite being high refractive index glasses, keeping the specific gravity within the above-stated range permits weight reduction of optical elements and conserves drive power in optical systems. For a given viscosity, since glasses of lower specific gravity tend to develop striae as the glass melt flows out, this characteristic is advantageous.

Manufacturing Preforms for Precision Press Molding

Clarified and homogenized glass melts corresponding to the various optical glasses were caused to flow at a constant rate out of a pipe made of platinum alloy that had been adjusted to a temperature within a temperature range permitting a stable outflow of glass without devitrification. Dripping or the drop cut method was employed to separate glass melt gobs having the weight of the targeted preforms. The glass melt gobs were received in receiving molds having bottoms with gas blow holes and formed into preforms for precision press molding while being floated by blowing gas through the gas blow holes. The separation interval of the glass melt was adjusted and set to obtain spherical preforms and compressed spheroid preforms.

Manufacturing of Optical Elements (Aspherical Lenses)

The preforms obtained by the above-described method were precision press molded with the pressing device shown in FIG. 1 to obtain aspherical lenses. Specifically, a preform was positioned between a lower mold 2 and an upper mold 1 constituting the pressing mold, the interior of a quartz tube 11 was backfilled with a nitrogen atmosphere, and a heater (not shown) was powered to heat the interior of quartz tube 11. The temperature within the pressing mold was set to a temperature at which the molded glass exhibited a viscosity of $10^8$ to $10^{10}$ dPa·s. While maintaining this temperature, pressing rod 13 was dropped, upper mold 1 was pressed, and the preform that had been placed in the pressing mold was pressed. A pressure of 8 MPa was applied for a period of 30 seconds. After pressing, the pressure was released and the press molded glass article was gradually cooled at a temperature at which the viscosity of the glass remained at $10^{12}$ dPa·s or greater with the article still in contact with lower mold 2 and upper mold 1. Rapid cooling to room temperature was then conducted, at which time the molded glass article was removed from the pressing mold and an aspherical lens was obtained. In FIG. 1, the pressure applied by pressing rod 13 is borne by holding member 10, which holds lower mold 2 and sleeve 3, and support rod 9, which supports upper mold 1, lower mold 2, sleeve 3, and holding member 10. A thermocouple 14 is inserted into lower mold 2 and monitors the temperature within the pressing mold. Upper mold 1, lower mold 2, and sleeve 3 are made of SiC, and a carbon mold-release film is provided on the molding surfaces of upper mold 1 and lower mold 2.

Aspherical concave meniscus lenses and aspherical biconcave lenses were thus manufactured. These lenses were suitable for use as lenses in image pickup optical systems.

The present invention provides a high refractive index, low dispersion optical glass suited to precision press molding. A preform for precision press molding can be manufactured from the optical glass of the present invention. The present invention further provides an optical element comprised of a high refractive index, low dispersion glass.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical glass comprising, denoted as molar percentages:
   0 to 20 percent $SiO_2$,
   5 to 40 percent $B_2O_3$,
   $SiO_2+B_2O_3$=15 to 50 percent,
   0.5 to 10 percent $Li_2O$,
   12 to 36 percent ZnO,
   where $3 \times Li_2O + ZnO \geqq 18$ percent,
   5 to 30 percent $La_2O_3$,
   0 to 20 percent $Gd_2O_3$,
   0 to 10 percent $Y_2O_3$,
   $La_2O_3+Gd_2O_3$=10 to 30 percent,
   $La_2O_3/SIGMA(\Sigma)RE_2O_3$=0.67 to 0.95
   (where $SIGMA(\Sigma)RE_2O_3=La_2O_3+Gd_2O_3+Y_2O_3+Yb_2O_3+Sc_2O_3+Lu_2O_3$),
   0.5 to 10 percent $ZrO_2$,
   1 to 15 percent $Ta_2O_5$,
   1 to 20 percent $WO_3$,
   $Ta_2O_5/WO_3 \leqq 2.5$ (molar ratio),
   0 to 8 percent $Nb_2O_5$,
   0 to 8 percent $TiO_2$, and
   no Te; and
   having a refractive index nd of not less than 1.87 and an Abbé number nu(v)d of not less than 35 but less then 40.

2. The optical glass according to claim 1, wherein the $Gd_2O_3$ content exceeds 0.4 percent.

3. The optical glass according to claim 1, further characterized in that the glass transition temperature Tg is not greater than 650° C. and the liquid phase temperature LT does not exceed 1100° C.

4. A preform for precision press molding comprised of the optical glass according to claim 1.

5. The preform for precision press molding according to claim 4, wherein the $Gd_2O_3$ content of the optical glass exceeds 0.4 percent.

6. The preform for precision press molding according to claim 4, wherein the glass transition temperature Tg of the optical glass is not greater than 650° C. and the liquid phase temperature LT of the optical glass does not exceed 1100° C.

7. An optical element comprised of the optical glass according to claim 1.

8. The optical element according to claim 7, wherein the $Gd_2O_3$ content of the optical glass exceeds 0.4 percent.

9. The optical element according to claim 7, wherein the glass transition temperature Tg of the optical glass is not greater than 650° C. and the liquid phase temperature LT of the optical glass does not exceed 1100° C.

10. A method of manufacturing a preform for precision press molding by separating a glass melt gob from a glass melt obtained by mixing, heating, and melting glass starting materials, and forming a preform in a glass melt gob cooling step, wherein said mixing, heating, and melting of glass starting materials is conducted so as to obtain an optical glass according to claim 1.

11. A method of manufacturing an optical element comprising:
    heating a preform according to claim 4, and
    conducting precision press molding with a pressing mold.

12. The method for manufacturing an optical element according to claim 11, further characterized by introducing a preform into said pressing mold and heating both said pressing mold and said preform.

13. The method for manufacturing an optical element according to claim 11, further characterized by introducing a preheated preform into a preheated pressing mold and conducting precision press molding.

14. The optical glass according to claim 2, further characterized in that the glass transition temperature Tg is not greater than 650° C. and the liquid phase temperature LT does not exceed 1100° C.

15. An optical element comprised of the optical glass according to claim 2.

16. A method of manufacturing a preform for precision press molding by separating a glass melt gob from a glass melt obtained by mixing, heating, and melting glass starting materials, and forming a preform in a glass melt gob cooling step, wherein said mixing, heating, and melting of glass starting materials is conducted so as to obtain an optical glass according to claim 2.

17. A method of manufacturing an optical element comprising: heating a preform manufactured by a method according to claim 10, and conducting precision press molding with a pressing mold.

* * * * *